US009785599B2

(12) United States Patent
Takeuchi

(10) Patent No.: US 9,785,599 B2
(45) Date of Patent: Oct. 10, 2017

(54) INFORMATION PROCESSING APPARATUS AND LOG OUTPUT METHOD

(71) Applicant: FUJITSU LIMITED, Kawasaki-shi, Kanagawa (JP)

(72) Inventor: Tamotsu Takeuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 14/714,384

(22) Filed: May 18, 2015

(65) Prior Publication Data
US 2015/0248369 A1 Sep. 3, 2015

Related U.S. Application Data

(63) Continuation of application No. PCT/JP2012/079953, filed on Nov. 19, 2012.

(51) Int. Cl.
H05K 7/10 (2006.01)
G06F 15/173 (2006.01)
G06F 13/40 (2006.01)
G06F 13/14 (2006.01)
G06F 9/44 (2006.01)
G06F 1/18 (2006.01)

(52) U.S. Cl.
CPC .......... G06F 13/4068 (2013.01); G06F 1/18 (2013.01); G06F 9/4411 (2013.01); G06F 13/14 (2013.01); G06F 13/4022 (2013.01)

(58) Field of Classification Search
None
See application file for complete search history.

(56) References Cited

U.S. PATENT DOCUMENTS

2012/0179804 A1* 7/2012 Katanp .............. G06F 13/4022
709/223

FOREIGN PATENT DOCUMENTS

JP 2009-110461 5/2009
JP 2011-197845 10/2011
JP 2011-253332 12/2011
WO 2009/040920 4/2009

OTHER PUBLICATIONS

International Search Report and Written Opinion of the International Searching Authority (Form PCT/ISA/210, Form PCT/ISA/237), mailed in connection with PCT/JP2012/079953 and mailed Feb. 12, 2013 (7 pages).

* cited by examiner

Primary Examiner — Hyun Nam
(74) Attorney, Agent, or Firm — Fujitsu Patent Center

(57) ABSTRACT

A storage unit stores management information including information indicative of a correspondence relation between a plurality of devices and a plurality of peripheral devices and information indicative of a correspondence relation between identification information assigned to a peripheral device by a device and a position of the peripheral device. Upon receipt, from the device, of a notification that identification information of any peripheral device has been changed, a computation unit updates the management information in accordance with the content of the change. Upon acquisition of identification information of a target peripheral device from any device when the device outputs a log regarding the peripheral device, the computation unit provides the device with information indicative of a position of the peripheral device with reference to the management information.

8 Claims, 23 Drawing Sheets

| DEVICE CONFIGURATION TABLE | | |
|---|---|---|
| UNIT | PHYSICAL POSITION | DEVICE NUMBER |
| SB#0 | SB#0-PCISW#0 | 0 |
| | SB#0-PCISW#1 | 1 |
| SB#1 | SB#1-PCISW#0 | 0 |
| | SB#1-PCISW#1 | 1 |
| IOU#0 | IOU#0-PCISW#0 | 0 |
| | IOU#0-slot#0 | 1 |
| | IOU#0-slot#1 | 2 |
| | ... | ... |
| IOU#1 | IOU#1-PCISW#0 | 0 |
| | IOU#1-slot#0 | 1 |
| | IOU#1-slot#1 | 2 |
| | ... | ... |
| IFB#0 | IFB#0-PCISW#0 | 0 |
| | IFB#0-slot#0 | 1 |
| | IFB#0-slot#1 | 2 |
| IFB#1 | IFB#1-PCISW#0 | 0 |
| | IFB#1-slot#0 | 1 |
| | IFB#1-slot#1 | 2 |
| PCIB#0 | PCIB#0-PCISW#0 | 0 |
| | PCIB#0-slot#0 | 1 |
| | PCIB#0-slot#1 | 2 |
| | ... | ... |
| PCIB#1 | PCIB#1-PCISW#0 | 0 |
| | PCIB#1-slot#0 | 1 |
| | PCIB#1-slot#1 | 2 |
| | ... | ... |

FIG. 11

PHYSICAL POSITION MANAGEMENT TABLE 165c

| SB | BUS NUMBER | DEVICE NUMBER | HIGHER-BUS NUMBER | PHYSICAL POSITION |
|---|---|---|---|---|
| SB#0 | 0 | 0 | — | SB#0-PCISW#0 |
| | 0 | 1 | — | SB#0-PCISW#1 |
| | 1 | 0 | 0 | IOU#0-PCISW#0 |
| | 2 | 1 | 1 | IOU#0-slot#0 |
| | 2 | 2 | 1 | IOU#0-slot#1 |
| | ... | ... | ... | ... |
| | 3 | 0 | 0 | IFB#0-PCISW#0 |
| | 4 | 1 | 3 | IFB#0-slot#0 |
| | 4 | 2 | 3 | IFB#0-slot#1 |
| | 5 | 0 | 4 | PCIB#0-PCISW#0 |
| | 6 | 1 | 5 | PCIB#0-slot#0 |
| | 6 | 2 | 5 | PCIB#0-slot#1 |
| | ... | ... | ... | ... |
| SB#1 | ... | ... | ... | ... |

INFORMATION PROCESSING APPARATUS AND LOG OUTPUT METHOD

CROSS-REFERENCE TO RELATED APPLICATION

This application is a continuation application of International Application PCT/JP2012/079953 filed on Nov. 19, 2012 which designated the U.S., the entire contents of which are incorporated herein by reference.

FIELD

The embodiments discussed herein relate to information processing apparatuses and log output methods.

BACKGROUND

Today, information processing apparatuses, such as a computer, are used. The examples of the information processing apparatuses include an information processing apparatus capable of enhancing the function by adding a peripheral device. For example, the operation of a peripheral device is controlled by a computation unit configured to perform arithmetic processing. A peripheral device may be added to the inside or outside of an information processing apparatus. For example, a peripheral device may be attached to or detached from a predetermined interface (may be referred to as an expansion slot) provided in an information processing apparatus. The examples of the interface include PCI (Peripheral Component Interconnect), PCI-X, and PCIe (PCI Express, registered trademark).

For the information processing apparatus, a method for supporting the maintenance of peripheral devices has been contemplated. For example, there is a proposal that when an I/O card expansion device, on which a plurality of I/O (Input/Output) cards may be mounted, is connected to a computer and used, a light source at a slot position of a failed I/O card inside the I/O card expansion device is caused to emit light and thereby notify a maintenance personnel of the slot position.

Note that, in order to manage the connection of a plurality of printed circuit boards inside a computer, there is also a proposal that each printed circuit board sequentially transmits the information about a mounting position to a printed circuit board at a higher-level connection position and the information about the mounting positions of the plurality of printed circuit boards is obtained from a printed circuit board at the highest-level connection position.

Japanese Laid-open Patent Publication No. 2011-253332
Japanese Laid-open Patent Publication No. 2009-110461

A plurality of devices (e.g., computation units) using peripheral devices may be provided in one information processing apparatus. In this case, a plurality of groups of a computation unit and a peripheral device used by the computation unit may be realized inside one information processing apparatus. Moreover, a combination of a computation unit and a peripheral device may be changed as needed. Such an information processing apparatus has a problem that when a failure occurs in a peripheral device, it is not easy to recognize the mounting position of the peripheral device inside the information processing apparatus.

For example, preferably, a maintenance personnel may easily recognize the position of a peripheral device in which a failure has occurred. Then, desirably, a log output by a device that uses a peripheral device may include the positional information about the peripheral device. Therefore, for example, a correspondence relation between identification information and mounting position of a peripheral device may be registered in advance into an information processing apparatus by hard coding, and used to provide the position information.

However, the identification information assigned to a peripheral device may change in accordance with a combination of the peripheral device and a device that uses the same. For example, in PCI, the identification information of even the same peripheral device may be changed by an operating system or the like operating on a higher-level device if the higher-level device, to which the same peripheral device is connected, is changed. Therefore, identification information initially assigned to a peripheral device may differ at another time point. That is, even if a correspondence relation between the identification information and positional information of the peripheral device is registered in advance, the correspondence relation is not always satisfied.

SUMMARY

According to an aspect of the embodiments, there is provided an information processing apparatus including a plurality of devices and a plurality of peripheral devices available to the plurality of devices, and capable of changing a peripheral device used by each of the plurality of devices, the apparatus including: a memory configured to store management information including information indicative of a correspondence relation between the plurality of devices and the plurality of peripheral devices and information indicative of a correspondence relation between identification information assigned to a peripheral device by any device that uses the peripheral device and information indicative of a position of the peripheral device; and a processor configured to perform a procedure including: upon receipt of a notification that identification information of a peripheral device has been changed, from a device that uses the peripheral device, updating the management information in accordance with content of the change; and upon acquisition of identification information of a peripheral device from any device when the device outputs a log regarding the peripheral device, providing the device with information indicative of a position of the peripheral device with reference to the management information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a device configuration table of the second embodiment;

FIG. 11 illustrates an example of a physical position management table of the second embodiment;

DESCRIPTION OF EMBODIMENTS

Figure 1:
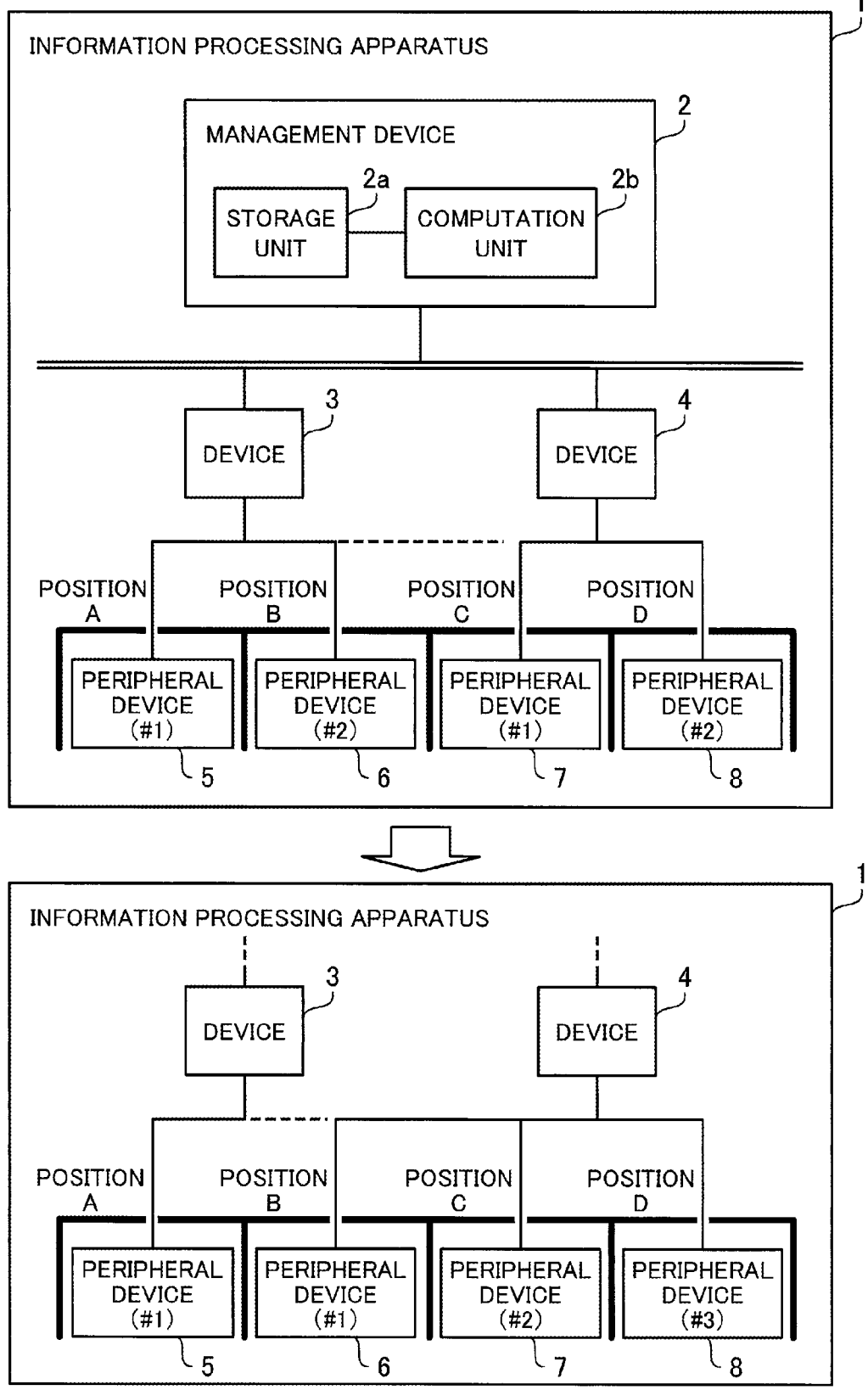
FIG. 1 illustrates an information processing apparatus of a first embodiment.

Several embodiments will be described below with reference to the accompanying drawings, wherein like reference numerals refer to like elements throughout.

First Embodiment

FIG. 1 illustrates an information processing apparatus of a first embodiment. An information processing apparatus 1 includes a management device 2, devices 3 and 4, and peripheral devices 5, 6, 7, and 8. The management device 2 manages the operations of the devices 3 and 4 and peripheral devices 5, 6, 7, and 8. The devices 3 and 4 may use the peripheral devices 5, 6, 7, and 8. It is possible to appropriately change which peripheral device the devices 3 and 4 may use. It may be possible to change when the devices 3 and 4 are under suspension, or when they are in operation.

The peripheral devices 5, 6, 7, and 8 are the devices for function expansion with respect to the information processing apparatus 1. The peripheral device 5 is provided at a position A. The peripheral device 6 is provided at a position B. The peripheral device 7 is provided at a position C. The peripheral device 8 is provided at a position D. The positions A, B, C, and D may be inside the information processing apparatus 1 or outside the information processing apparatus 1. A position inside the information processing apparatus 1 is the position of an expansion slot incorporated in the information processing apparatus 1, for example. A position outside the information processing apparatus 1 is the position of an expansion slot in an external device externally connected to the information processing apparatus 1, for example.

The management device 2, the devices 3 and 4, and the peripheral devices 5, 6, 7, and 8 are connected via a bus inside the information processing apparatus 1. For example, the information processing apparatus 1 may change the peripheral devices 5, 6, 7, and 8 used by the devices 3 and 4, by changing a logical connection relationship via the bus between the devices 3 and 4 and the peripheral devices 5, 6, 7, and 8. The management device 2 may control to switch the logical connection relationship.

The management device 2 includes a storage unit 2a and a computation unit 2b. The storage unit 2a may be a memory, such as a RAM (Random Access Memory). The computation unit 2b may be a processor, such as a CPU (Central Processing Unit). The information processing of the first embodiment may be implemented by the computation unit 2b that executes programs stored in the storage unit 2a.

The storage unit 2a stores management information. The management information includes information indicative of a correspondence relation between the devices 3 and 4 and the peripheral devices 5, 6, 7, and 8. For example, the peripheral devices 5 and 6 are associated with the device 3. The peripheral devices 7 and 8 are associated with the device 4. That is, the device 3 uses the peripheral devices 5 and 6 and the device 4 uses the peripheral devices 7 and 8.

The management information includes information indicative of a correspondence relation between the pieces of identification information assigned by the device 3 to the peripheral devices 5 and 6 used by the device 3 and the pieces of information indicative of the positions of the peripheral devices 5 and 6. Moreover, the management information includes information indicative of a correspondence relation between the pieces of identification information assigned by the device 4 to the peripheral devices 7 and 8 used by the device 4 and the pieces of information indicative of the positions of the peripheral devices 7 and 8. The pieces of identification information may be assigned by BIOS (Basic Input/Output System) or OS (Operating System) operating on the devices 3 and 4. For example, if the peripheral devices 5, 6, 7, and 8 are the devices for PCI, BIOS or OS may assign, to each peripheral device, identification information obtained by combining a bus number, a device number, and the like. The correspondence relation includes the following associations (1) to (4), in this example.

(1) An association between identification information #1 of the peripheral device 5 assigned by the device 3 and the information indicative of the position A. (2) An association between identification information #2 of the peripheral device 6 assigned by the device 3 and the information indicative of the position B. (3) An association between identification information #1 of the peripheral device 7 assigned by the device 4 and the information indicative of the position C. (4) An association between identification information #2 of the peripheral device 8 assigned by the device 4 and the information indicative of the position D.

Upon receipt of a notification that identification information of a peripheral device has been changed, from a device that uses the peripheral device, the computation unit 2b updates the management information stored in the storage unit 2a in accordance with the content of the change. For example, assume that the logical connection with the device 3 of the peripheral device 6 used by the device 3 has been released, i.e., the device 3 is now not allowed to use the peripheral device 6. Then, the device 3 notifies the management device 2 of the deletion of the identification information with respect to the peripheral device 6, for example. The computation unit 2b deletes the correspondence relation between the device 3 and the peripheral device 6 from the management information in response to the notification, and also deletes the information indicative of the association (2) from the management information.

Moreover, for example, assume that a logical connection between the device 4 and the peripheral device 6 has been added. That is, assume that the device 4 is now allowed to use the peripheral device 6. Then, the device 4 notifies the management device 2 of the addition of identification information with respect to the peripheral device 6, for example. The notification includes the identification information assigned by the device 4 to the peripheral device 6. When the device 4 has re-assigned the pieces of identification information of the peripheral devices 6, 7, and 8, the notification includes the pieces of identification information re-assigned to the peripheral devices 6, 7, and 8. For example, as the result of the re-assignment, the identification information #1 is set to the peripheral device 6, the identification information #2 is set to the peripheral device 7, and the identification information #3 is set to the peripheral device 8.

The computation unit 2b adds the correspondence relation between the device 4 and the peripheral device 6 to the management information in response to the notification. Moreover, the computation unit 2b adds, to the management information, (5) an association between the identification information #1 of the peripheral device 6 assigned by the device 4 and the information indicative of the position B.

Furthermore, the computation unit 2b rewrites the associations (3) and (4) in the management information to the following associations (6) and (7), respectively. (6) An association between the identification information #2 of the peripheral device 7 assigned by the device 4 and the information indicative of the position C. (7) An association between the identification information #3 of the peripheral device 8 assigned by the device 4 and the information indicative of the position D.

Upon acquisition of the identification information of a peripheral device from any device when the device outputs a log regarding the peripheral device, the computation unit 2b provides the device with information indicative of the position of the peripheral device with reference to the management information. For example, upon acquisition of the identification information #1 from the device 4 when the device 4 outputs the log regarding the peripheral device 6, the computation unit 2b provides the device 4 with the information indicative of the position B based on the above-described association (5) of the management information.

The device 4 may output a log regarding the peripheral device 6 including the information indicative of the position B. For example, the log may be a message registered in a predetermined log file output by the device 4, or may be a message displayed on a display device (the illustration is omitted in FIG. 1) connected to the information processing apparatus 1. Alternatively, the log may be a message or the like transmitted to a terminal device used by an administrator or a maintenance personnel or to the mail address of the administrator or the maintenance personnel.

In the information processing apparatus 1, upon receipt of a notification that identification information of a peripheral device has been changed, from a device that uses the peripheral device, the computation unit 2b updates the management information in accordance with the content of the change. Upon acquisition of identification information of a peripheral device from any device when the device outputs a log regarding the peripheral device, the computation unit 2b provides the device with information indicative of the position of the peripheral device with reference to the management information.

Thus, the position of the peripheral device may be provided as needed. Specifically, the logical connection relationship between the devices 3 and 4 and the peripheral devices 5, 6, 7, and 8 may be changed. In changing the connection relationship, the pieces of identification information of the peripheral devices 5, 6, 7, and 8 may be changed by the devices 3 and 4. That is, the pieces of identification information assigned to the peripheral devices 5, 6, 7, and 8 by the devices 3 and 4 are not absolute ones. For example, if the peripheral devices 5, 6, 7, and 8 are the devices for PCIe or the like, the pieces of identification information may be changed by BIOS or OS operating on the devices 3 and 4 that re-assigns the bus numbers with respect to the peripheral devices 5, 6, 7, and 8.

Here, for example, assume that a logical connection relationship has been changed to a relationship in which the device 4 may use the peripheral devices 6, 7, and 8 as described above. In this case, if the above-described associations (1) to (4) are maintained in the management information, then upon acquisition of the identification information #1 assigned to the peripheral device 6 by the device 4, the management device 2 will provide the information indicative of the position C. This is the information indicative of the position of the peripheral device 7, but is not the appropriate position (the position B is correct).

On the other hand, the information processing apparatus 1 updates the management information following a change in the correspondence relation between the devices 3 and 4 and the peripheral devices 5, 6, 7, and 8. Thus, the appropriate positions of the peripheral devices 5, 6, 7, and 8 may be provided to the devices 3 and 4. The devices 3 and 4 may output a log including the information indicative of the positions. A maintenance personnel may easily recognize the position of a peripheral device in which a failure or the like has occurred, in the information processing apparatus 1, by referring to the logs output by the devices 3 and 4. Therefore, a maintenance personnel may promptly start a maintenance work of the peripheral device.

Second Embodiment

Figure 2:
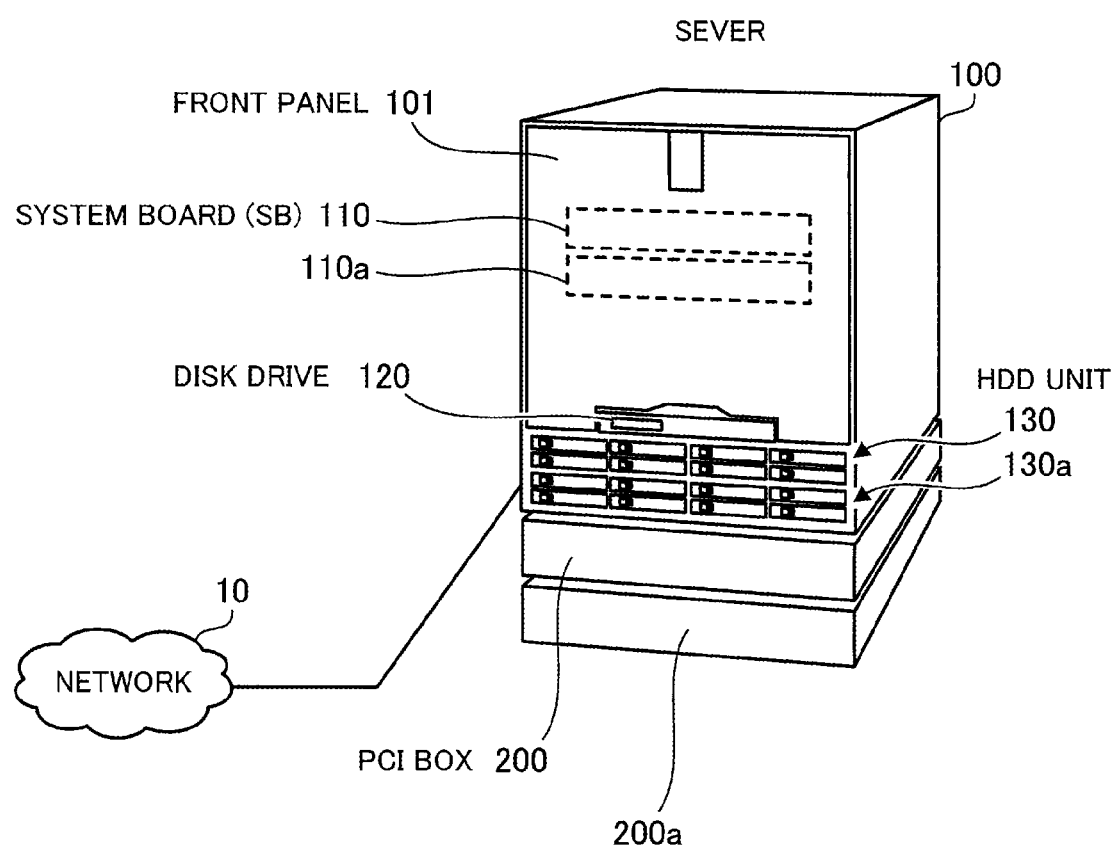
FIG. 2 illustrates an information processing system of a second embodiment.

FIG. 2 illustrates an information processing system of a second embodiment. The information processing system of the second embodiment includes a server 100 and PCI boxes 200 and 200a. The server 100 is connected to a network 10. The network 10 may be a LAN (Local Area Network), a WAN (Wide Area Network), the Internet, or the like.

The server 100 is a server computer configured to execute predetermined job processing. The server 100 includes a front panel 101, system boards (SB) 110 and 110a, a disk drive 120, and HDD (Hard Disk Drive) units 130 and 130a. The front panel 101 is a cover for covering the front face of the server 100. The front panel 101 is openable and closable. The SBs 110 and 110a are housed on the back side of the front panel 101.

The SBs 110 and 110a are the computation units having a CPU and a RAM mounted thereon. The disk drive 120 is a drive unit configured to read the programs or data recorded on a portable storage medium. The HDD units 130 and 130a are units each for mounting an HDD. The HDD units 130 and 130a are capable of housing a plurality of magnetic discs, SSDs (Solid State Drives), and the like. The PCI boxes 200 and 200a are the external devices provided with a plurality of expansion slots (may be referred to as PCI slots) for PCIe. The PCI boxes 200 and 200a are connected to the server 100 via a predetermined interface.

Figure 3:
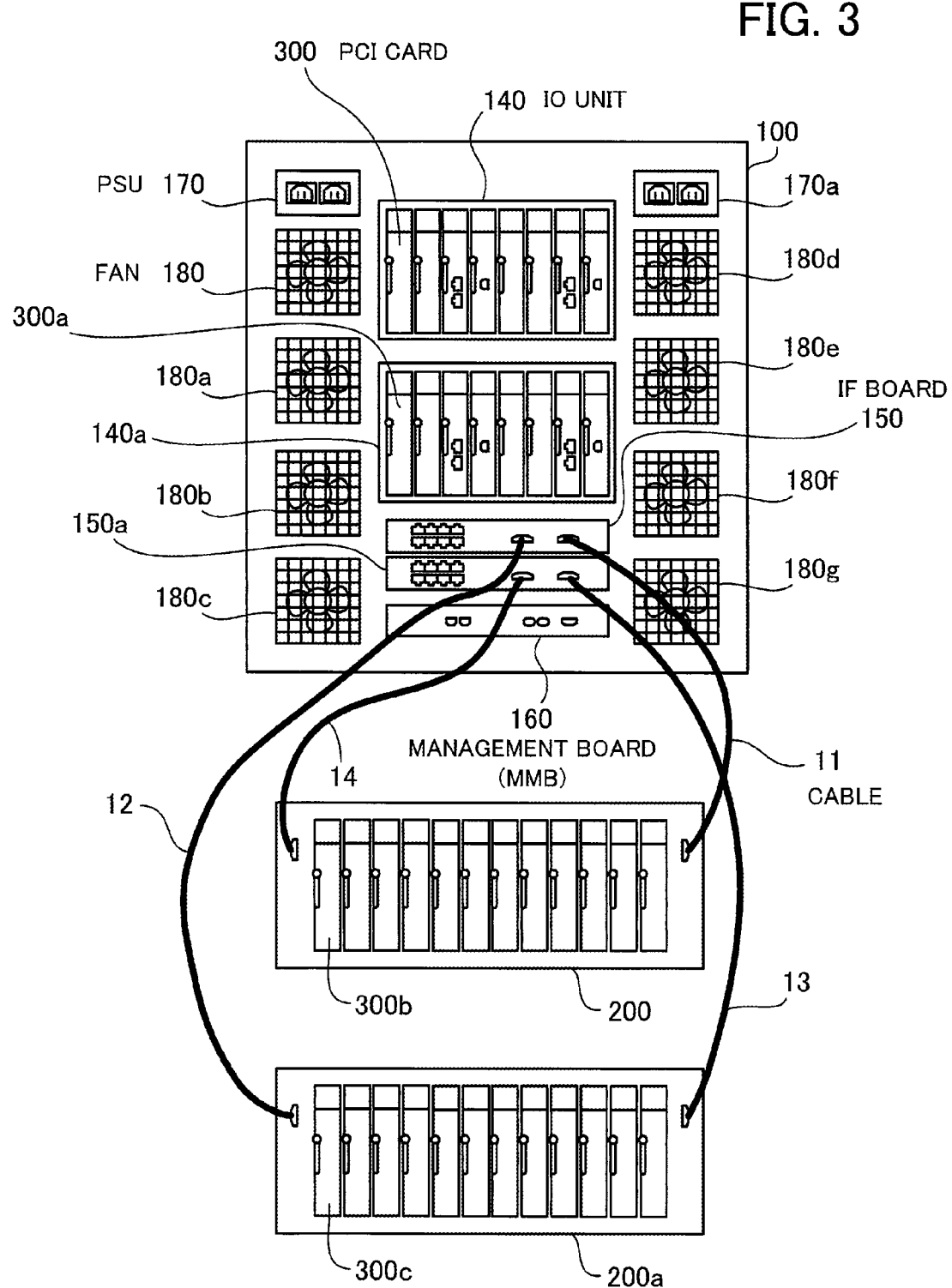
FIG. 3 illustrates a back face of a server of the second embodiment.

FIG. 3 illustrates the back face of the server of the second embodiment. The server 100 includes IO (Input Output) units 140 and 140a, IF (InterFace) boards 150 and 150a, a management board (MMB) 160, PSUs (Power Supply Units) 170 and 170a, and fans 180, 180a, 180b, 180c, 180d, 180e, 180f, and 180g in addition to the respective units described in FIG. 2.

The IO units 140 and 140a are the units configured to control the input and output of the server 100. The IO units 140 and 140a control the input and output of data with respect to the HDD units 130 and 130a. The IO units 140 and 140a control the input and output of data with respect to the IF boards 150 and 150a. Moreover, the IO units 140 and 140a control the input and output of data with respect to the PCI boxes 200 and 200a.

The IO units 140 and 140a each include a plurality of PCI slots (e.g., eight slots). One PCI slot may mount one PCI card. For example, one PCI slot of the IO unit 140 may mount a PCI card 300. One PCI slot of the IO unit 140a may mount a PCI card 300a. The PCI cards 300 and 300a are the peripheral devices for the SBs 110 and 110a. The IO units 140 and 140a control the input and output of data with respect to the PCI cards 300 and 300a. The IO units 140 and 140a may be referred to as the peripheral devices for the SBs 110 and 110a.

The IO units 140 and 140a may include an external connection interface (e.g., a USB (Universal Serial Bus) port, a VGA (Video Graphics Array) port, or the like) for a keyboard, a display, and a mouse (KVM). These interfaces may be provided by the PCI cards 300 and 300a.

The IF boards 150 and 150a include an interface (e.g., PCIe) for accessing a network. The IF boards 150 and 150a include an interface for accessing the PCI boxes 200 and 200a. The IF board 150 is connected to the PCI box 200 via a cable 11. The IF board 150 is connected to the PCI box 200a via a cable 12. The IF board 150a is connected to the PCI box 200a via a cable 13. The IF board 150a is connected to the PCI box 200 via a cable 14. The cables 11, 12, 13, and 14 are the external cables for PCIe, for example.

The MMB 160 is the control unit for monitoring the server 100 and managing the connection relationship between the SBs 110 and 110a and the peripheral devices.

The PSUs 170 and 170a are the power supply devices connected to a commercial power source. The PSUs 170 and 170a are the power supply devices configured to supply electric power for driving the server 100 to the whole server 100.

The fans 180, 180a, 180b, 180c, 180d, 180e, 180f, and 180g are the cooling devices for cooling the server 100.

The PCI boxes 200 and 200a each include a plurality of PCI slots (e.g., 12 slots). One PCI slot may mount one PCI card. For example, one PCI slot of the PCI box 200 may mount a PCI card 300. One PCI slot of the PCI box 200a may mount a PCI card 300a. The PCI cards 300b and 300c are the peripheral devices for the SBs 110 and 110a. The PCI boxes 200 and 200a control the input and output of data with respect to the PCI cards 300b and 300c. The PCI boxes 200 and 200a may be referred to as the peripheral devices for the SBs 110 and 110a.

The PCI cards 300, 300a, 300b, and 300c are the peripheral devices compliant with PCIe. The PCI cards 300, 300a, 300b, and 300c may be for expanding the ports for a fiber channel, a LAN, a CNA (Converged Network Adapter), a SAS (Serial Attached Small Computer System Interface) or the like. The PCI cards 300, 300a, 300b, and 300c may be the cards having an image processing function, a sound processing function, and the like. The PCI cards 300, 300a, 300b, and 300c may be the cards for enhancing the other functions. The PCI cards 300, 300a, 300b, and 300c may be the cards referred to as PCI cassettes, PCI card cassettes, or the like.

Note that, in the description below, the PCI cards mounted on the IO unit 140 are designated by 300 series reference numerals (301, 302, . . . ). The PCI cards mounted on the IO unit 140a are designated by 300a series reference numerals (301a, 302a, . . . ). The PCI cards mounted on the PCI box 200 are designated by 300b series reference numerals (301b, 302b, . . . ). The PCI cards mounted on the PCI box 200a are designated by 300c series reference numerals (301c, 302c, . . . ).

Figure 4:
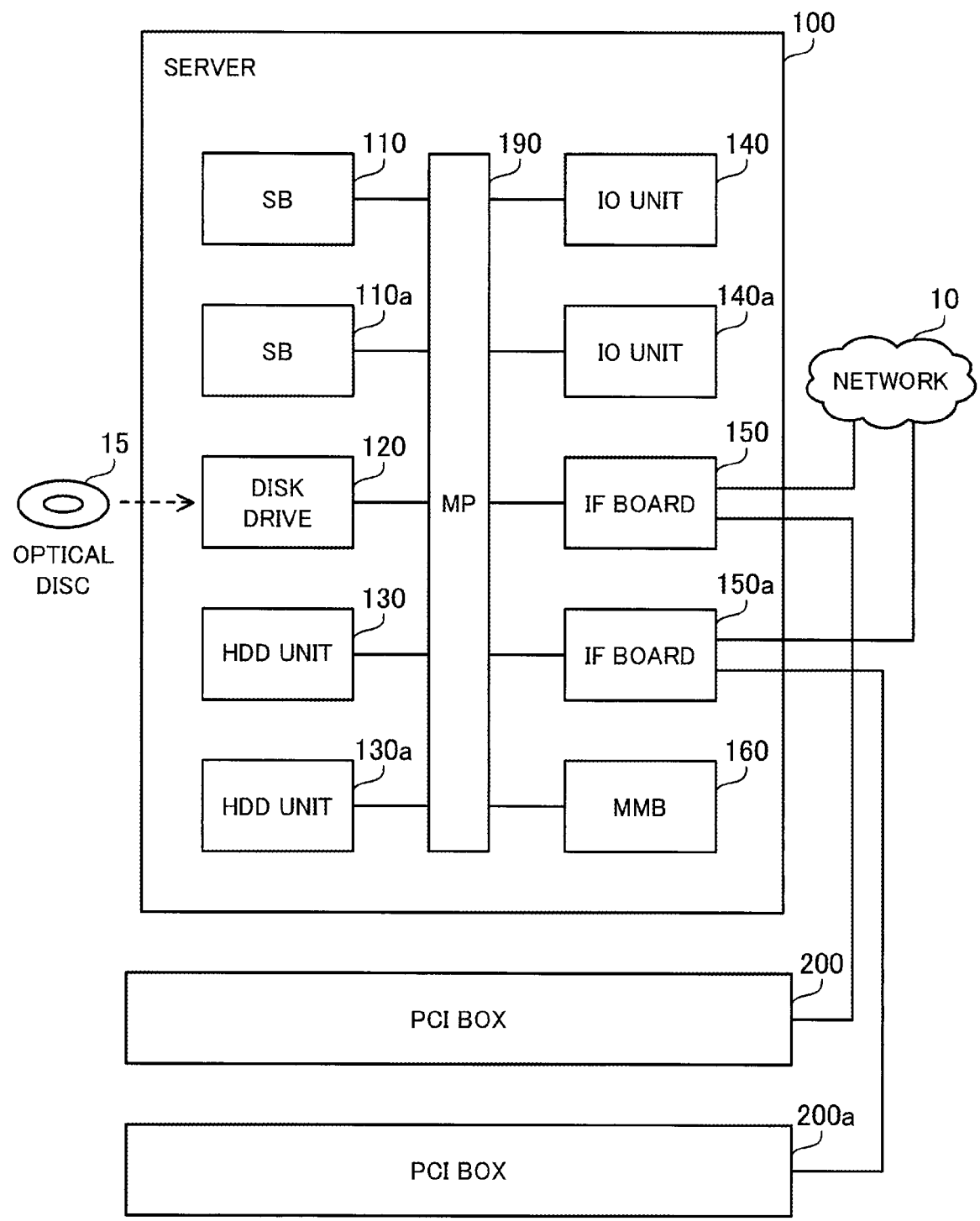
FIG. 4 illustrates an example of a hardware configuration of the second embodiment.

FIG. 4 illustrates an example of the hardware configuration of the second embodiment. The server 100 includes the SBs 110 and 110a, the disk drive 120, the HDD units 130 and 130a, the IO units 140 and 140a, the IF boards 150 and 150a, the MMB 160, and an MP (Middle Plane) 190. The illustration of the other units illustrated in FIGS. 2 and 3 are omitted. The SBs 110 and 110a, disk drive 120, HDD units 130 and 130a, IO units 140 and 140a, IF boards 150 and 150a, and MMB 160 are the same as those described in FIGS. 2 and 3.

For example, the disk drive 120 may read programs and/or data recorded on the optical disc 15 using a laser beam or the like. For example, a DVD (Digital Versatile Disc), a DVD-RAM, a CD-ROM (Compact Disc Read Only Memory), a CD-R (Recordable)/RW (ReWritable), or the like may be used as the optical disc 15. The disk drive 120 stores the programs and/or data read from the optical disc 15 into an HDD or predetermined memory of the HDD units 130 and 130a in accordance with an instruction from the SBs 110 and 110a, for example.

Moreover, an OS or application programs executed by the SBs 110 and 110a and the various types of data used in the processing performed by the SBs 110 and 110a are stored in the HDD units 130 and 130a. The IF boards 150 and 150a are connected to the network 10 via a predetermined cable. Note that, in FIG. 4, the illustration of a part of the connection between the IF boards 150 and 150a and the PCI boxes 200 and 200a is omitted.

The MP 190 is a connector unit configured to connect and wire between the SBs 110 and 110a, disk drive 120, HDD units 130 and 130a, IO units 140 and 140a, IF boards 150 and 150a, and MMB 160. For example, the SBs 110 and 110a, disk drive 120, and HDD units 130 and 130a may be connected from the front face of the server 100. Moreover, the IO units 140 and 140a, IF boards 150 and 150a, and MMB 160 may be connected from the back face of the server 100.

Figure 5:
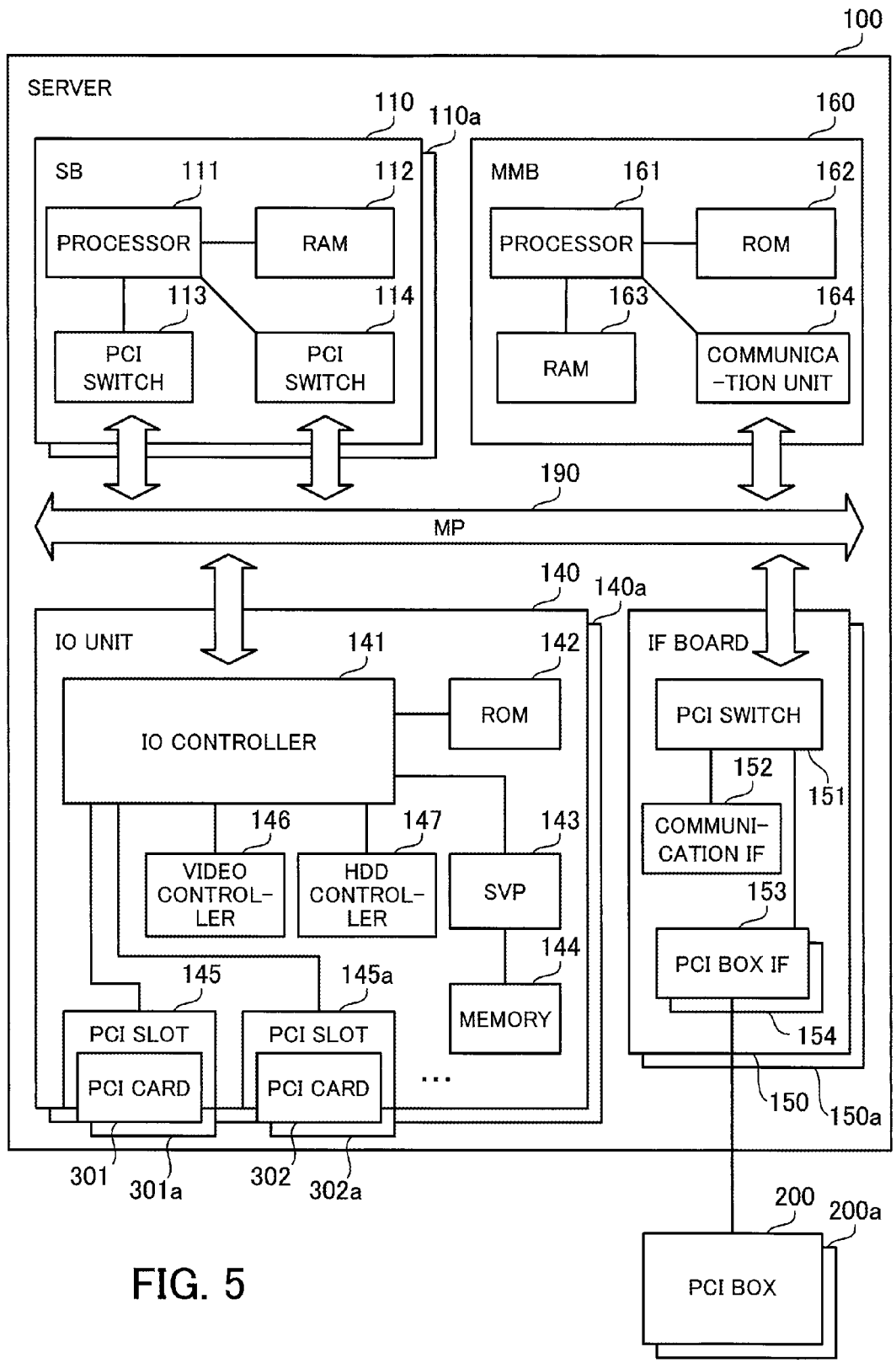
FIG. 5 illustrates an example of a hardware configuration of the server of the second embodiment.

FIG. 5 illustrates an example of the hardware configuration of the server of the second embodiment. The SB 110 includes a processor 111, a RAM 112, and PCI switches 113 and 114. The SB 110a also includes the same devices as the SB 110.

The processor 111 controls the information processing of the SB 110. The processor 111 may be a multiprocessor. The processor 111 may be, for example, a CPU, an MPU (Micro Processing Unit), a DSP (Digital Signal Processor), an ASIC (Application Specific Integrated Circuit), an FPGA (Field Programmable Gate Array), a PLD (Programmable Logic Device), or the like. The processor 111 may be a combination of two or more of the CPU, MPU, DSP, ASIC, FPGA, PLD, and the like.

The RAM 112 temporarily stores at least a part of the BIOS, OS, and application programs executed by the processor 111. Moreover, the RAM 112 stores various types of data used for the processing performed by the processor 111.

The PCI switches 113 and 114 are the switch devices configured to provide a PCIe interface for internal-bus connection. The PCI switches 113 and 114 are connected to the MP 190. The PCI switches 113 and 114 relay the communication between the processor 111 and the IO units 140 and 140a, IF boards 150 and 150a, MMB 160, and PCI boxes 200 and 200a.

The IO unit 140 includes an IO controller 141, a ROM (Read Only Memory) 142, an SVP (SerVice Processor) 143, a memory 144, PCI slots 145, 145a, . . . , a video controller 146, and an HDD controller 147. The IO unit 140a also includes the same devices as the IO unit 140.

The IO controller 141 is a switch device having the interface for PCIe, the legacy interface (e.g., the interface for connecting with the ROM 142, and the interface for connecting with the SVP 143), and the like aggregated therein. The IO controller 141 also has the function of the PCI switch. The IO controller 141 may include a VGA port or a USB port so as to have an input output function of the KVM. The IO controller 141 is connected to the MP 190. The IO controller 141 relays the communication between the SBs 110 and 110a and the PCI slot 145, 145a, video controller 146, and HDD controller 147.

The ROM 142 is a memory configured to store the program of the BIOS and firmware programs. The SBs 110 and 110a may read and execute the programs stored in the ROM 142.

The SVP 143 is a management processor configured to collect the information about each device of the IO unit 140 and provide the same to the MMB 160. A dedicated interface for direct communication between the SVP 143 and the MMB 160 may be provided.

The memory 144 is the memory configured to store firmware programs executed by the SVP 143.

The PCI slots 145, 145a, . . . are the slots into which a PCI card may be inserted. For example, the PCI card 301 is inserted in the PCI slot 145. The PCI card 302 is inserted in the PCI slot 145a. Note that the PCI cards 301a, 302a, . . . are inserted in the respective PCI slots of the IO unit 140a.

The video controller 146 outputs an image to a display (the illustration is omitted) connected to the server 100, in accordance with an instruction from the SBs 110 and 110a. The video controller 146 may be realized by a device compliant with PCIe.

The HDD controller 147 writes or reads data to or from an HDD or SSD mounted on the HDD units 130 and 130a, in accordance with an instruction from the SBs 110 and 110a. The HDD controller 147 may be realized by a device compliant with PCIe.

The IF board 150 includes a PCI switch 151, a communication IF 152, and PCI box IFs 153 and 154. The IF board 150a also includes the same devices as the IF board 150.

The PCI switch 151 is the switch device configured to provide a PCIe interface for internal-bus connection. The PCI switch 151 is connected to the MP 190. The PCI switch 151 relays the communication between the SBs 110 and 110a and the communication IF 152 and PCI box IFs 153 and 154.

The communication IF 152 is the interface for connecting with the network 10. The communication IF 152 may be a wired interface, or may be a wireless interface.

The PCI box IFs 153 and 154 are the interfaces for connecting with the PCI boxes 200 and 200a. The PCI box IFs 153 and 154 may be the interfaces compliant with PCIe.

The MMB 160 includes a processor 161, a ROM 162, a RAM 163, and a communication unit 164.

The processor 161 controls the information processing of the MMB 160. The processor 161 may be a multiprocessor. The processor 161 is a CPU, an MPU, a DSP, an ASIC, an FPGA, a PLD, or the like, for example. The processor 161 may be a combination of two or more elements of the CPU, MPU, DSP, ASIC, FPGA, PLD, and the like.

The ROM 162 is the memory configured to store firmware programs executed by the processor 161. Moreover, the ROM 162 stores various types of data used for the processing performed by the processor 161.

The RAM 163 temporarily stores at least a part of the firmware programs executed by the processor 161. Moreover, the RAM 163 stores various types of data used for the processing performed by the processor 161.

The communication unit 164 is the device configured to provide an interface for internal-bus connection. The communication unit 164 is connected to the MP 190. The communication unit 164 relays the communication between the processor 161 and the SBs 110 and 110a, IO units 140 and 140a, and IF boards 150 and 150a.

Here, in the description below, the SBs 110 and 110a, IO units 140 and 140a, IF boards 150 and 150a, and PCI boxes 200 and 200a may be collectively referred to as a "PCI unit". Moreover, the devices mounted on each PCI unit, such as the PCI switch 113 and PCI card 301, may be collectively referred to as a "PCI device". Both the PCI unit and the PCI device are just an example of the peripheral device.

Figure 6:
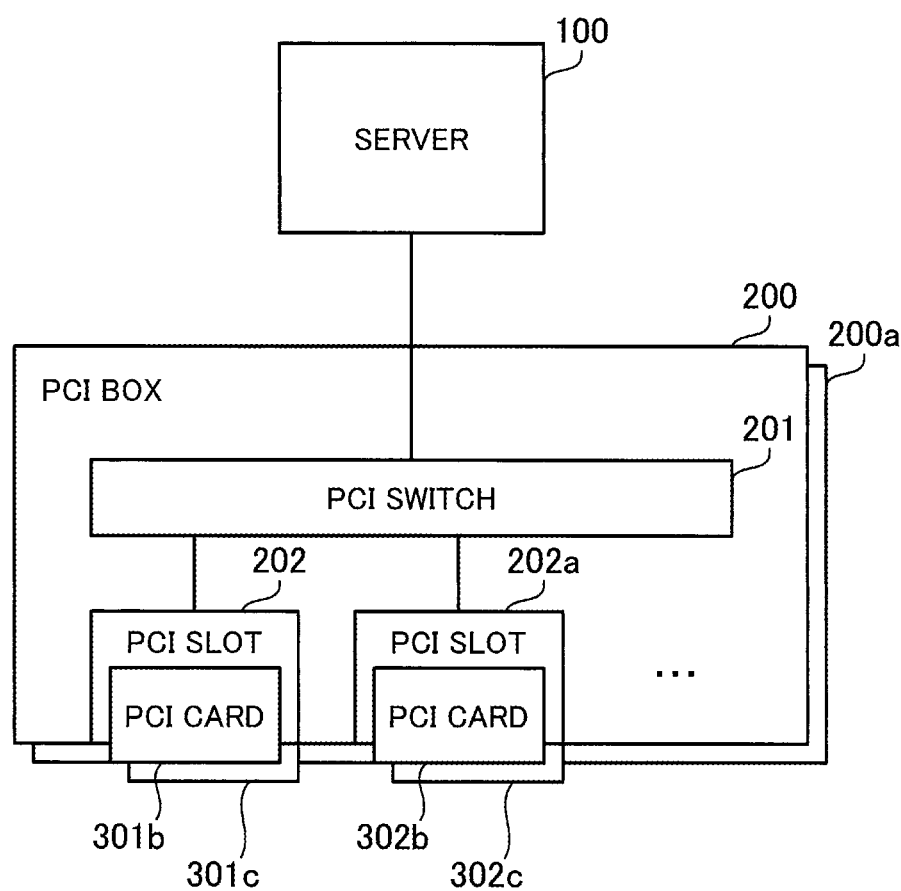
FIG. 6 illustrates an example of a hardware configuration of a PCI box of the second embodiment.

FIG. 6 illustrates an example of the hardware configuration of the PCI box of the second embodiment. The PCI box 200 includes a PCI switch 201 and PCI slots 202, 202a, and so on. The PCI box 200a also includes the same PCI device as the PCI box 200.

The PCI switch 201 is the PCI device configured to provide a PCI interface for connecting with the server 100. The PCI switch 201 relays the communication between the server 100 and the PCI slots 202, 202a, and so on.

The PCI slots 202, 202a, . . . are the expansion slots into which a PCI card may be inserted. For example, a PCI card 301b is inserted in the PCI slot 202. A PCI card 302b is inserted in the PCI slot 202a. Note that PCI cards 301c, 302c, . . . are inserted in the respective PCI slots of the PCI box 200a.

Figure 7:
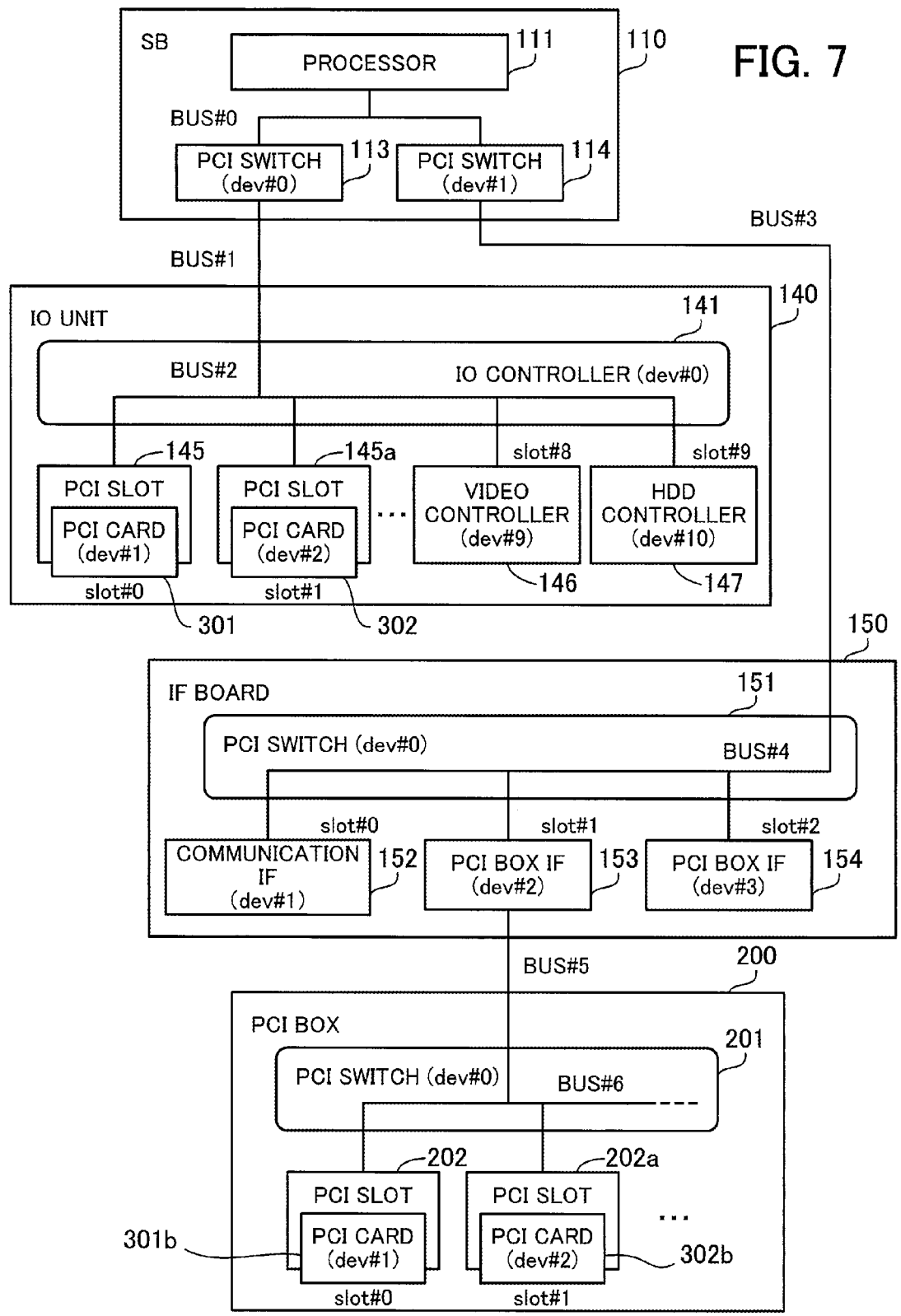
FIG. 7 illustrates an example of the connection of PCI devices of the second embodiment.

FIG. 7 illustrates an example of the connection of the PCI devices of the second embodiment. In FIG. 7, there is illustrated a logical connection (PCI device tree) of the PCI devices, with the SB 110 set as the highest-level device. A route complex is incorporated in the processor 111. For example, the IO unit 140 is connected under the SB 110, the IF board 150 is connected under the SB 110, and the PCI box 200 is connected under the IF board 150. That is, one group including the SB 110, IO unit 140, IF board 150, and PCI box 200 as the elements is realized.

Here, in PCIe, each PCI device may be identified using a bus number and a device number. The device number is unique with respect to the bus number. That is, a combination (e.g., denoted as "bus number:device number") of a bus number and a device number serves as the identification information of each PCI device. In FIG. 7, the identification information of each PCI device is as follows, for example.

The bus directly under the processor 111 inside the SB 110 has the bus number "0" (in FIG. 7, denoted by BUS #0, and the same is true hereinafter). The PCI switch 113 has the device number "0" (in FIG. 7, denoted as dev#0, and the same is true hereinafter). The PCI switch 114 has the device number "1". Therefore, the identification information of the PCI switch 113 is "0:0". The identification information of the PCI switch 114 is "0:1".

The bus directly under the PCI switch 113 has the bus number "1". The IO controller 141 of the IO unit 140 is connected directly under the PCI switch 113. The IO controller 141 has the device number "0". Therefore, the identification information of the IO controller 141 is "1:0".

The bus inside the IO controller 141 has the bus number "2". The PCI slots 145, 145a, . . . , video controller 146, and HDD controller 147 are connected to the IO controller 141. The PCI card 301 inserted in the PCI slot 145 has the device number "1". The PCI card 302 inserted in the PCI slot 145a has the device number "2". Therefore, the identification information of the PCI card 301 is "2:1". The identification information of the PCI card 302 is "2:2". The identification information of each of other PCI cards is also assigned similarly.

Moreover, the video controller 146 has the device number "9". Therefore, the identification information of the video controller 146 is "2:9". The HDD controller has the device number "10". Therefore, the identification information of the HDD controller is "2:10".

Here, the PCI slots 145, 145a, . . . , the video controller 146, and the HDD controller 147 are mounted at predetermined positions of the IO unit 140, respectively. The information indicative of this position is referred to as a slot number. If the slot number of the IO unit 140 is known, the PCI device mounted at the position may be identified (e.g., if the slot number of the IO unit 140 is the PCI slot 145, then the PCI device is the PCI card 301). The slot number of the PCI slot 145 is "0" (in FIG. 7, denoted as slot#0, and the same is true hereinafter). The slot number of the PCI slot 145a is "1". The slot numbers of other PCI slots are also assigned similarly. The slot number of the video controller 146 is "8". The slot number of the HDD controller 147 is "9".

The bus directly under the PCI switch 114 has the bus number "3". The PCI switch 151 of the IF board 150 is connected under the PCI switch 114. The PCI switch 151 has the device number "0". Therefore, the identification information of the PCI switch 151 is "3:0".

The bus inside the PCI switch 151 has the bus number "4". The communication IF 152 and the PCI box IFs 153 and 154 are connected to the PCI switch 151. The communication IF 152 has the device number "1". The PCI box IF 153 has the device number "2". The PCI box IF 154 has the device number "3". Therefore, the identification information of the communication IF 152 is "4:1", the identification information of the PCI box IF 153 is "4:2", and the identification information of the PCI box IF 154 is "4:3".

The bus directly under the PCI box IF 153 has the bus number "5". The PCI switch 201 of the PCI box 200 is connected under the PCI box IF 153. The PCI switch 201 has the device number "0". Therefore, the identification information of the PCI switch 201 is "5:0".

Here, the slot numbers are also assigned to the mounting positions of the communication IF 152 and the PCI box IFs 153 and 154, respectively. The slot number of the communication IF 152 is "0". The slot number of the PCI box IF 153 is "1". The slot number of the PCI box IF 154 is "2".

The bus inside the PCI switch 201 has the bus number "6". The PCI slots 202, 202a, . . . are connected to the PCI switch 201. The PCI slot 202 (or PCI card 301b inserted in the PCI slot 202) has the device number "1". The PCI slot 202a (or PCI card 301b inserted in the PCI slot 202a) has the device number "2". Therefore, the identification information of the PCI card 301b is "6:1". The identification information of the PCI card 302b is "6:2". The identification information of each of other PCI cards is also assigned similarly.

Here, the slot numbers are also assigned to the mounting positions of the PCI slots 202, 202a, . . . , respectively. The slot number of the PCI slot 202 is "0". The slot number of the PCI slot 202a is "1". The slot numbers of other PCI slots are also assigned similarly.

Note that, the identification information of a device is a combination of a bus number and a device number. However, if a plurality of functions is available in one device, the device may be managed in the unit of function using identification information obtained by further combining the function numbers indicative of each of the plurality of functions. In this case, the device will be treated virtually as a plurality of devices (however, there is only one corresponding slot number). For example, if the video controller 146 has a moving picture processing function and a sound processing function, different identification information (identification information having the same bus number and the same device number but having a different function number) may be assigned to the respective image processing function and sound processing function for the purpose of management.

Figure 8:
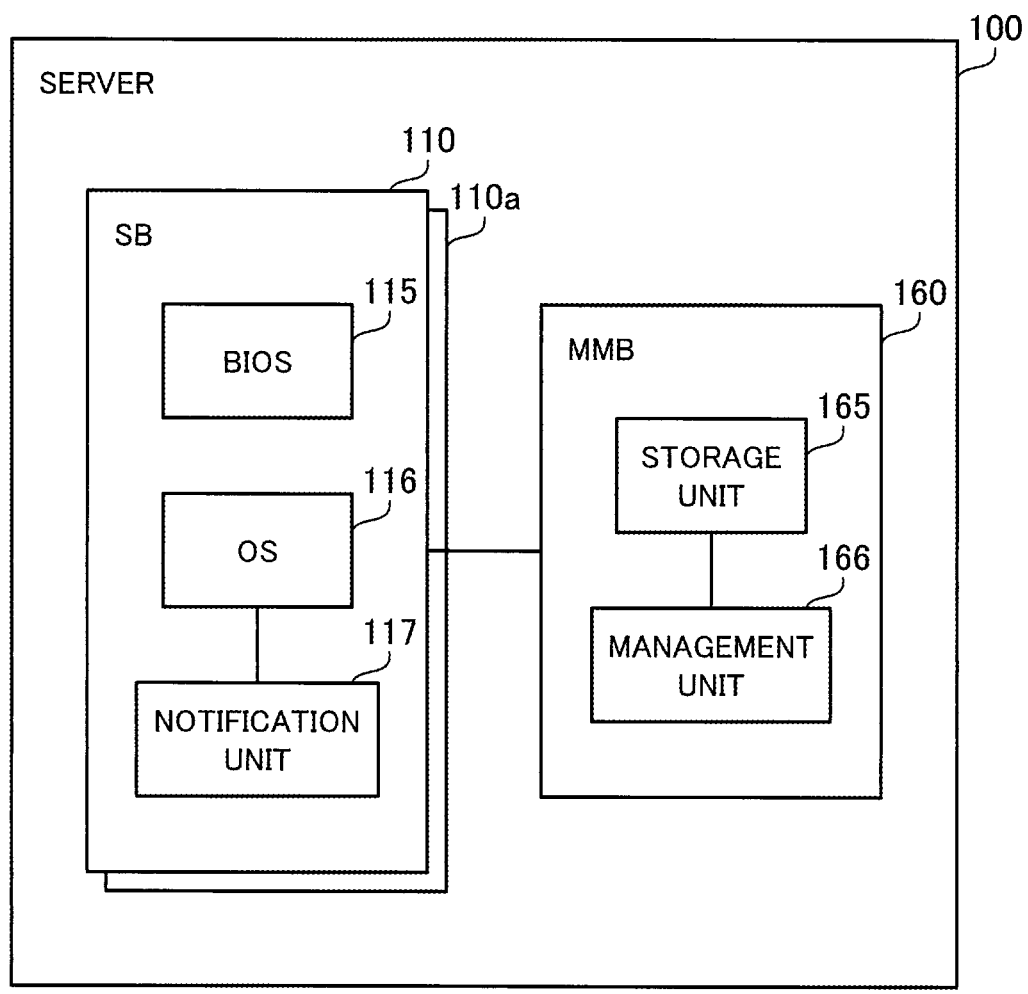
FIG. 8 illustrates an example of a software configuration of the second embodiment.

FIG. 8 illustrates an example of the software configuration of the second embodiment. The function of the SB 110 illustrated in FIG. 8 may be realized by the processor 111 that executes programs stored in the RAM 112. The function of the MMB 160 illustrated in FIG. 8 may be realized by the processor 161 that executes programs stored in the RAM 163. Note that the SB 110a also has the same function as the SB 110. The SB 110 includes a BIOS 115, an OS 116, and a notification unit 117.

The BIOS 115 controls a peripheral device used by the SB 110. The BIOS 115 performs predetermined preparation processing for using a peripheral device. The BIOS 115 searches a PCI bus that may be used by the SB 110. The BIOS 115 generates information (hereinafter, simply referred to as PCI device tree information) indicative of the PCI device tree illustrated in FIG. 7, based on the search result. The PCI device tree information is a linked list made by linking a higher node and a lower node with a pointer, for example. The BIOS 115 may communicate with the MMB 160. Moreover, the BIOS 115 outputs a log regarding a peripheral device.

The OS 116 is basic software configured to provide an interface with various kinds of hardware to another software, such as a job application. The OS 116 initializes a PCI device during startup or when the mount, deletion or the like of the PCI device is performed. At this time, the OS 116 may change the PCI device tree information, which is generated by the BIOS, so as to be able to optimally perform the processing of the OS 116. This is because the information generated by the BIOS 115 is not always generated conveniently for the processing of the OS 116. Moreover, the OS 116 outputs a log regarding a peripheral device.

The notification unit 117 mediates the communication between the OS 116 and the MMB 160. The notification unit 117 provides the MMB 160 with the information obtained by the OS 116. Moreover, the notification unit 117 provides the OS 116 with the information obtained from the MMB 160.

The MMB 160 includes a storage unit 165 and a management unit 166. The storage unit 165 stores the information used in the processing performed by the management unit 166. The information includes the information indicative of the logical connection setting between the PCI units, the information for managing the physical position of a slot in each PCI unit, and the like.

The management unit 166 obtains the setting content of a peripheral device made by the BIOS 115 or OS 116, and stores the same into the storage unit 165. The management unit 166 manages the position, at which each PCI device is mounted, based on the information stored in the storage unit 165. Upon receipt of an inquiry of the position of any PCI device from the BIOS 115 or OS 116, the management unit 166 provides information indicative of the position of the PCI device with reference to the information stored in the storage unit 165.

Figure 9:
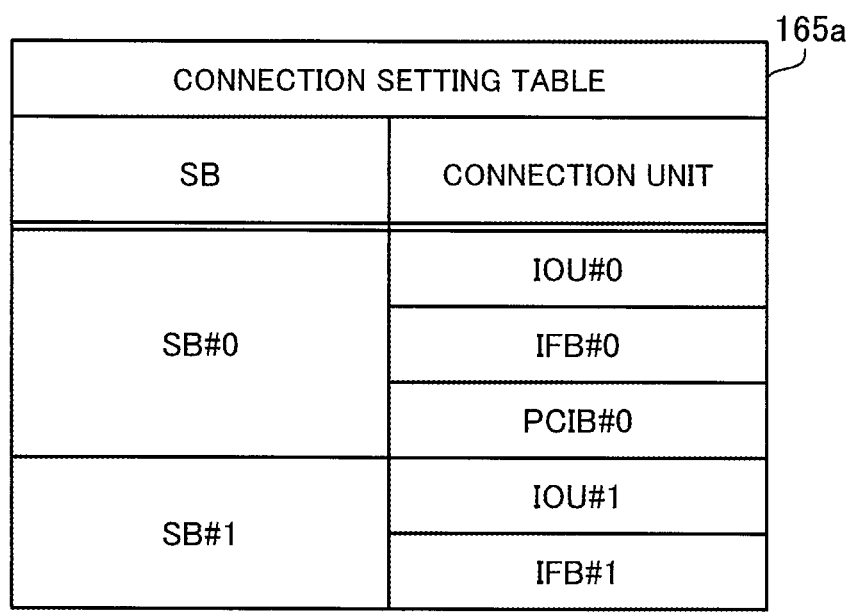
FIG. 9 illustrates an example of a connection setting table of the second embodiment.

FIG. 9 illustrates an example of a connection setting table of the second embodiment. A connection setting table 165a is the information defining the logical connection setting between the SBs 110 and 110a, IO units 140 and 140a, IF boards 150 and 150a, and PCI boxes 200 and 200a. The connection setting table 165a may be referred to as the information defining a connection relationship between the PCI units. The connection setting table 165a is stored into the storage unit 165. The connection setting table 165a includes the items of SB and connection unit.

The identification information of an SB is registered into the item of SB. The information indicative of the IO unit, IF board, and PCI box used by the SB is registered into the item of connection unit. Here, the identification information of each of these PCI units is as follows.

The identification information of the SB 110 is "SB#0". The identification information of the SB 110a is "SB#1". The identification information of the IO unit 140 is "IOU#0". The identification information of the IO unit 140a is "IOU#1". The identification information of the IF board 150 is "IFB#0". The identification information of the IF board 150a is "IFB#1". The identification information of the PCI box 200 is "PCIB#0". The identification information of the PCI box 200a is "PCIB#1".

For example, the information indicating that the SB is "SB#0", and the connection units are "IOU#0", "IFB#0", and "PCIB#0" is registered in the connection setting table 165a. This indicates that the SB 110 and the IO unit 140, IF board 150, and PCI box 200 are logically connected to constitute one group (may be referred to as a partition).

Moreover, for example, the information indicating that the SB is "SB#1", and the connection units are "IOU#1" and "IFB#1" is registered in the connection setting table 165a. This indicates that the SB 110a and the IO unit 140a and IF board 150a are logically connected to constitute one group.

Note that the identification information of the PCI box 200a is not registered in the connection setting table 165a. This means that the PCI box 200a does not belong to any group and is therefore free.

FIG. 10 illustrates an example of a device configuration table of the second embodiment. A device configuration table 165b is the information associating the slot position of each PCI unit with the device number in the server 100. The device configuration table 165b is stored into the storage unit 165. The device configuration table 165b includes the items of unit, physical position, and device number.

The identification information of each PCI unit is registered into the item of unit. The information indicative of the position of a slot and the position of a PCI device in the PCI unit is registered into the item of physical position. The device number corresponding to the physical position is registered into the item of device number.

For example, the information indicating that the unit is "SB#0", the physical position is "SB#0-PCISW#0", and the device number is "0" is registered into the device configuration table 165b. This indicates that "SB#0-PCISW#0" is assigned as the information indicative of the physical position of the PCI switch 113 of the SB 110a and that the device number "0" is assigned to the PCI switch 113.

In this manner, in the device configuration table 165b, the information indicative of each PCI unit, the position of a slot in the PCI unit, the position of a PCI device, and the device number are associated with each other in advance.

FIG. 11 illustrates an example of a physical position management table of the second embodiment. A physical position management table 165c is generated by the management unit 166 and is stored into the storage unit 165. The physical position management table 165c includes the items of SB, bus number, device number, higher-bus number, and physical position.

The identification information of an SB is registered into the item of SB. A bus number is registered into the item of bus number. A device number is registered into the item of device number. The bus number of a higher-level bus is registered into the item of higher-bus number. The information indicative of the position of a slot or the position of a PCI device is registered into the item of physical position.

For example, the information indicating that the bus number is "0", the device number is "0", the higher-bus number is "-" (no setting), and the physical position is "SB#0-PCISW#0" is registered in the physical position management table 165c. This indicates that the information indicative of the physical position of the PCI switch 113 whose identification information (bus number:device number) is "0:0" used by the SB 110 is "SB#0-PCISW#0".

Moreover, for example, the information indicating that the bus number is "2", the device number is "1", the higher-bus number is "1", and the physical position is "IOU#0-slot#0" is registered in the physical position management table 165c. This indicates that the information indicative of the physical position of the PCI card 301 whose identification information is "2:1" used by the SB 110 is "IOU#0-slot#0".

Next, an example of a GUI (Graphical User Interface) provided by the management unit 166 is described.

Figure 12A:
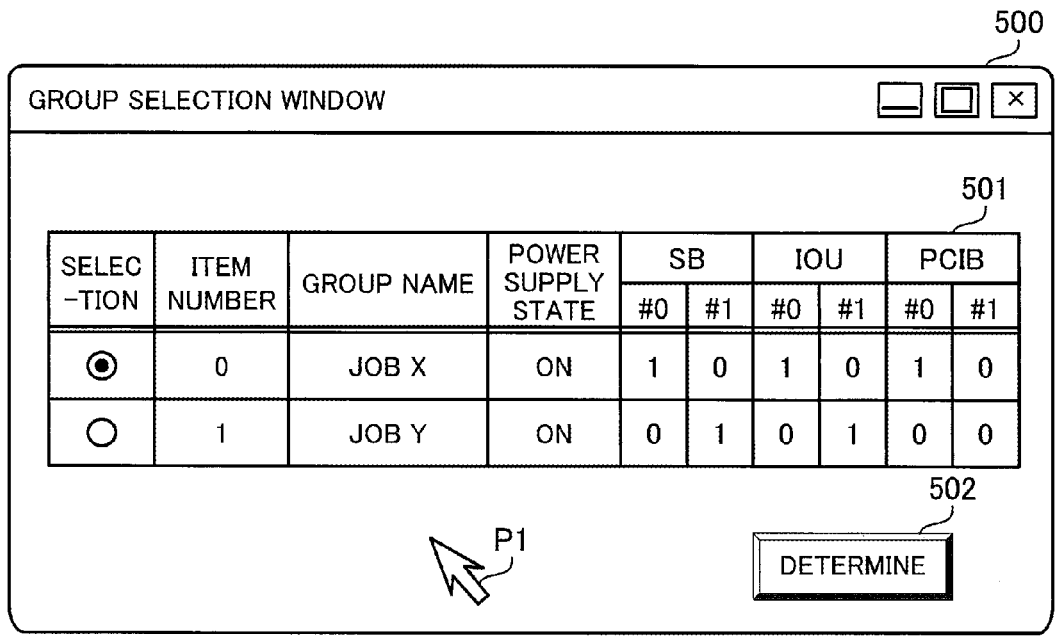
FIGS. 12A and 12B illustrate an example of a connection setting GUI of the second embodiment.
Figure 12B:
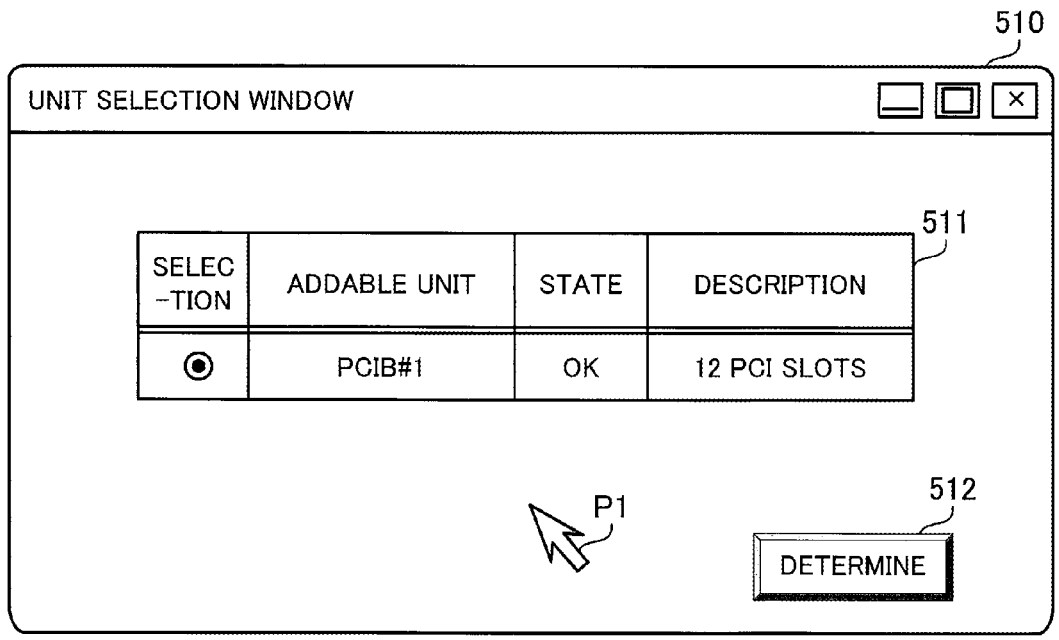

FIGS. 12A and 12B illustrate an example of a connection setting GUI of the second embodiment. FIG. 12A illustrates a group selection window 500. FIG. 12B illustrates a unit selection window 510.

The management unit 166 may generate information of the group selection window 500 and of the unit selection window 510, and display the same on a display connected to the server 100. Alternatively, the management unit 166 may display the group selection window 500 and the unit selection window 510 in a browser on a computer that communicates with the server 100 via the network 10 (or another network directly connected to the MMB 160).

The management unit 166 updates the connection setting table 165a stored in the storage unit 165, based on the information input to the group selection window 500 and the unit selection window 510. For example, a system administrator may input information to the group selection window 500 and unit selection window 510 using an input device, such as a mouse or a keyboard, connected to the server 100.

The group selection window 500 is the GUI for selecting, from among a plurality of groups, a group to which a system administrator desires to add a PCI unit. For example, a group list display area 501 and a determination button 502 are provided in the group selection window 500.

The group list display area 501 is the area for displaying a list of groups. One row corresponds to one group. The group list display area 501 includes the items of selection, item number, group name, power supply state, SB, IOU, and PCIB.

A form (e.g., radio button) for selecting a row is displayed in the item of selection. A row number is displayed in the item of item number. A name (in the example of the group list display area 501, a job name "job X", "job Y", or the like) for identifying a group is displayed in the item of group name. The power supply state ("ON" or "OFF") of each group is displayed in the item of power supply state. Information indicative of an SB belonging to the group is displayed in the item of SB. Specifically, "1" is registered with respect to the identification information of an SB belonging to the group. On the other hand, "0" is registered with respect to the identification information of an SB not belong to the group. Information indicative of an IO unit belonging to the group is displayed in the item of IOU. Information indicative of a PCI box belonging to the group is registered in the item of PCIB.

For example, information indicating that the item number is "0", the group name is "job X", the power supply state is "ON", SB#0 is "1", SB#1 is "0", IOU#0 is "1", IOU#1 is "0", PCIB#0 is "1", and PCIB#1 is "0" is displayed in the group list display area 501.

This indicates that the group corresponding to the item number "0" includes the SB 110, the IO unit 140, and the PCI box 200, that the group name thereof is "job X", and that the power supply state is "ON". Note that, assume that the IF board 150 belongs to the same group as the SB 110.

For example, in the group list display area 501, the row of the item number "0" is selected in the item of selection. The determination button 502 is for determining the selection. For example, once the determination button 502 is depressed with a pointer P1, the selection is determined. Then, the management unit 166 generates the information of the unit selection window 510.

The unit selection window 510 is the GUI for receiving the selection of a PCI unit desired to be added to a group. For example, a unit list display area 511 and a determination button 512 are provided in the unit selection window 510.

The unit list display area 511 is the area for displaying a list of addable PCI units. The unit list display area 511 includes the items of selection, addable unit, state, and description.

A form (e.g., radio button) for selecting a row is displayed in the item of selection. The identification information of a free PCI unit (addable PCI unit) is displayed in the item of addable unit. The state of the PCI unit is displayed in the item of state. The description, such as the specification of the PCI unit, is displayed in the item of description.

For example, information indicating that the addable unit is "PCIB#1", the state is "OK", and the description is "12 PCI slots" is displayed in the unit list display area 511. This indicates that the PCI box 200a is currently free, the state of the PCI unit is normal ("OK"), and the PCI box 200a has 12 PCI slots.

For example, the PCI box 200a is selected in the unit list display area 511. The determination button 512 is for determining the selection. For example, once the determination button 512 is depressed with the pointer P1, the selection is determined. Then, the management unit 166 adds the PCI box 200a to the group of the item number "0". Thus, the connection setting table 165a will also be updated.

Another information (e.g., the group name or the like) to be displayed in the group list display area 501 may be registered in the connection setting table 165a.

Note that, in the example of FIGS. 12A and 12B, the operation in adding a PCI unit to a group is illustrated, but deletion of a PCI unit from a group may be performed. For example, a button for displaying a GUI for deletion is provided in the group selection window 500. For example, in the GUI for deletion, a form for selecting a PCI unit desired to be deleted from a list of PCI units included in a group, which is selected in the group selection window 500, and a button for determining the selection are displayed. Then, the PCI unit selected using the GUI for deletion may be deleted from the selected group and set free. The freed PCI unit may be re-added to the same group or different group.

In this manner, in the server 100, a logical connection relationship with an SB may be changed in the unit of PCI unit, as needed. If such a change is made, a PCI device with respect to the SB will be changed, for example. Therefore, the OS operating on the SB will re-assign a bus number with respect to the PCI device. Moreover, a replacement in the unit of PCI device is also performed in the server 100.

Figure 13:
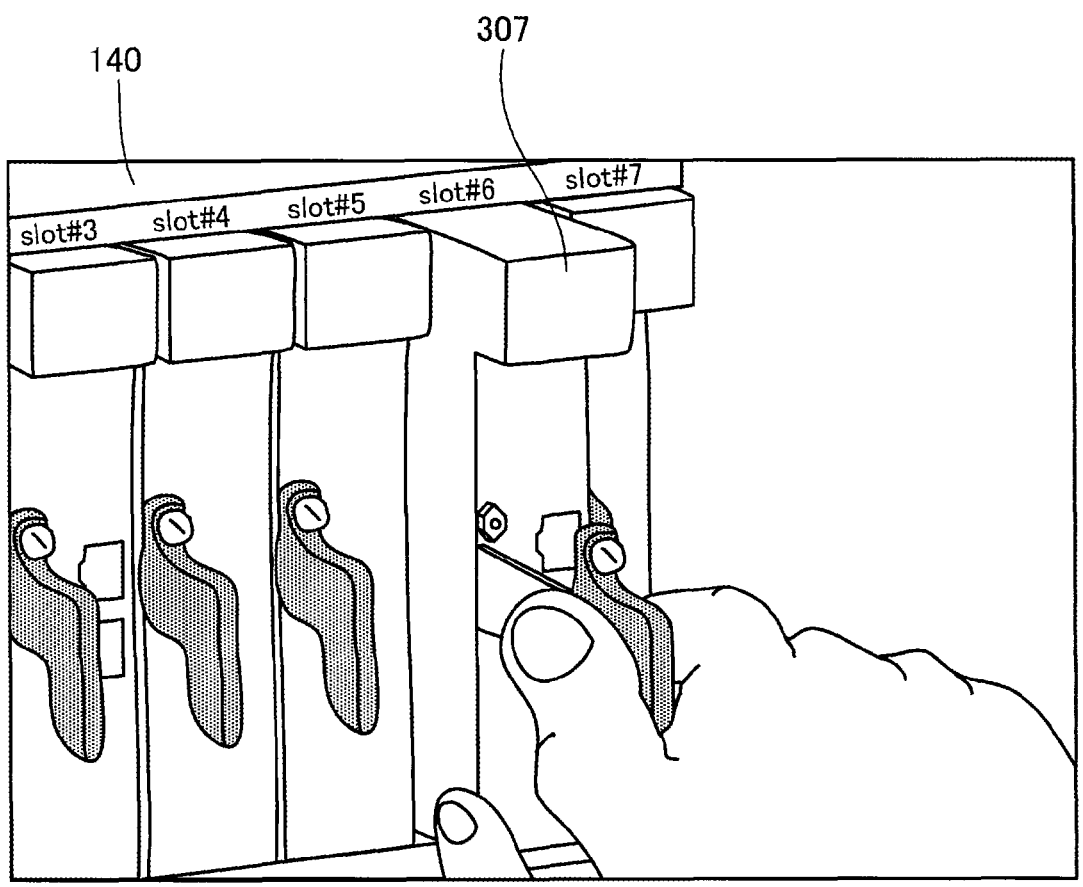
FIG. 13 illustrates an example of the replacement work of a PCI card of the second embodiment.

FIG. 13 illustrates an example of the replacement work of a PCI card of the second embodiment. FIG. 13 illustrates how a PCI card 307 is removed from a PCI slot (slot number "6") of the IO unit 140 and replaced. For example, by a maintenance work or the like, a PCI card is removed from or newly inserted into the IO units 140 and 140a and PCI boxes 200 and 200a. In this manner, also when a replacement or the like in the unit of PCI card occurs, a PCI device with respect to an SB needs to be changed. In particular, such replacement of a PCI card may be performed when the server 100 is in operation (active maintenance), or may be performed during suspension of the server 100. If the replacement is performed when the server 100 is in operation, the OS operating on the SB will re-assign a bus number with respect to the PCI device.

Even if a bus number with respect to the PCI device is re-assigned, the management unit 166 will reestablish the correspondence relation between identification information after the update of each PCI device and information indicative of the physical position. Next, a procedure of the second embodiment is described. Although the procedure related to the SB 110 is described in the description below, the procedure related to the SB 110a is the same.

Figure 14:
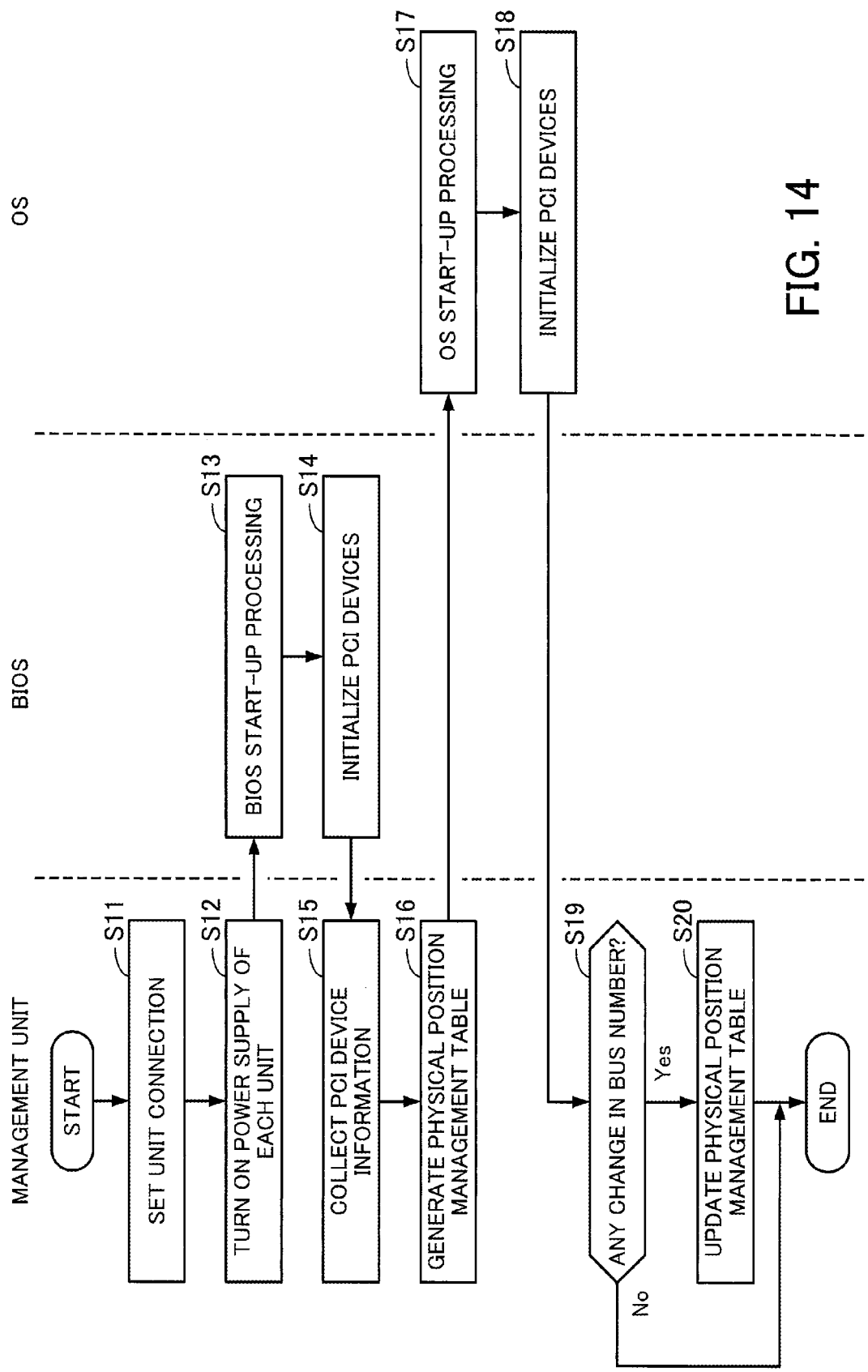
FIG. 14 is a flowchart illustrating a procedure of the second embodiment.

FIG. 14 is a flowchart illustrating the procedure of the second embodiment. Hereinafter, the procedure illustrated in FIG. 14 is described along the step numbers.

(Step S11) The management unit 166 performs the logical connection setting between the PCI units with reference to the connection setting table 165a stored in the storage unit 165.

(Step S12) The management unit 166 turns on the power supply of each PCI unit.

(Step S13) The processor 111 loads the program of the BIOS 115 stored in the ROM 142 into the RAM 112, and exhibits the function of the BIOS 115 (start-up processing of the BIOS 115).

(Step S14) The BIOS 115 initializes PCI devices. Specifically, the BIOS 115 assigns a bus number to each PCI device, and generates PCI device tree information. The BIOS 115 notifies the management unit 166 that the initialization of the PCI devices is complete. The management unit 166 receives the notification.

(Step S15) The management unit 166 collects the information about the PCI devices from the BIOS 115. The information collected from the BIOS 115 includes the PCI device tree information.

(Step S16) The management unit 166 generates the physical position management table 165c based on the information collected from the BIOS 115 and the connection setting table 165a and device configuration table 165b stored in the storage unit 165. For example, the management unit 166 may recognize a tree structure of the PCI units using the connection setting table 165a. In the example of the connection setting table 165a, the IO unit 140 (IOU#0) and IF board 150 (IF#0) are the PCI units that may be incorporated into the server 100, and will be connected directly under the SB 110 (SB#0). Moreover, the PCI box 200 (PCIB#0) is a PCI unit to be external to the server 100, and will be connected under the IF board 150. Moreover, the device number of each PCI device is registered in the device configuration table 165b. Because the tree structure and device numbers of the PCI units may be recognized from the connection setting table 165a and device configuration table 165b, the bus number of each PCI device may be recognized based on the tree structure and device numbers of the PCI units and the PCI device tree information obtained from the BIOS 115. The management unit 166 registers the thus recognized bus number of each PCI device into the physical position management table 165c.

(Step S17) The processor 111 loads into the RAM 112 the program of the OS 116 stored in the HDD unit 130, and exhibits the function of the OS 116 (start-up processing of the OS 116).

(Step S18) The OS 116 initializes PCI devices and/or device drivers. Specific processing contents are the same as in step S14. In the initialization, the OS 116 may change the bus number of each PCI device assigned by the BIOS 115. Upon completion of the initialization of the PCI devices by the OS 116, the notification unit 117 notifies the management unit 166 of the completion of the initialization. The management unit 166 receives the notification.

(Step S19) The management unit 166 collects the information about the PCI devices from the OS 116 via the notification unit 117. The information collected from the OS 116 includes the PCI device tree information. The management unit 166 determines whether or not there is any change in the setting of the bus number of each PCI device due to the processing of step S18. When there is any change, the procedure is advanced to step S20, while when there is no change, the procedure is terminated.

(Step S20) The management unit 166 updates the physical position management table 165c in accordance with a change of the bus number made by the OS 116.

In this manner, the management unit 166 manages the correspondence relation between the identification information, which is assigned to each PCI device by the BIOS 115 and the OS 116 during startup, and the information indicative of the physical position of each PCI device. In particular, because identification information assigned by the BIOS 115 (first software) may be changed by the OS 116 (second software), the information indicative of the correspondence relation is also updated in accordance with the change. Next, the procedures in the above-described steps S16 and S20 are specifically described.

Figure 15:
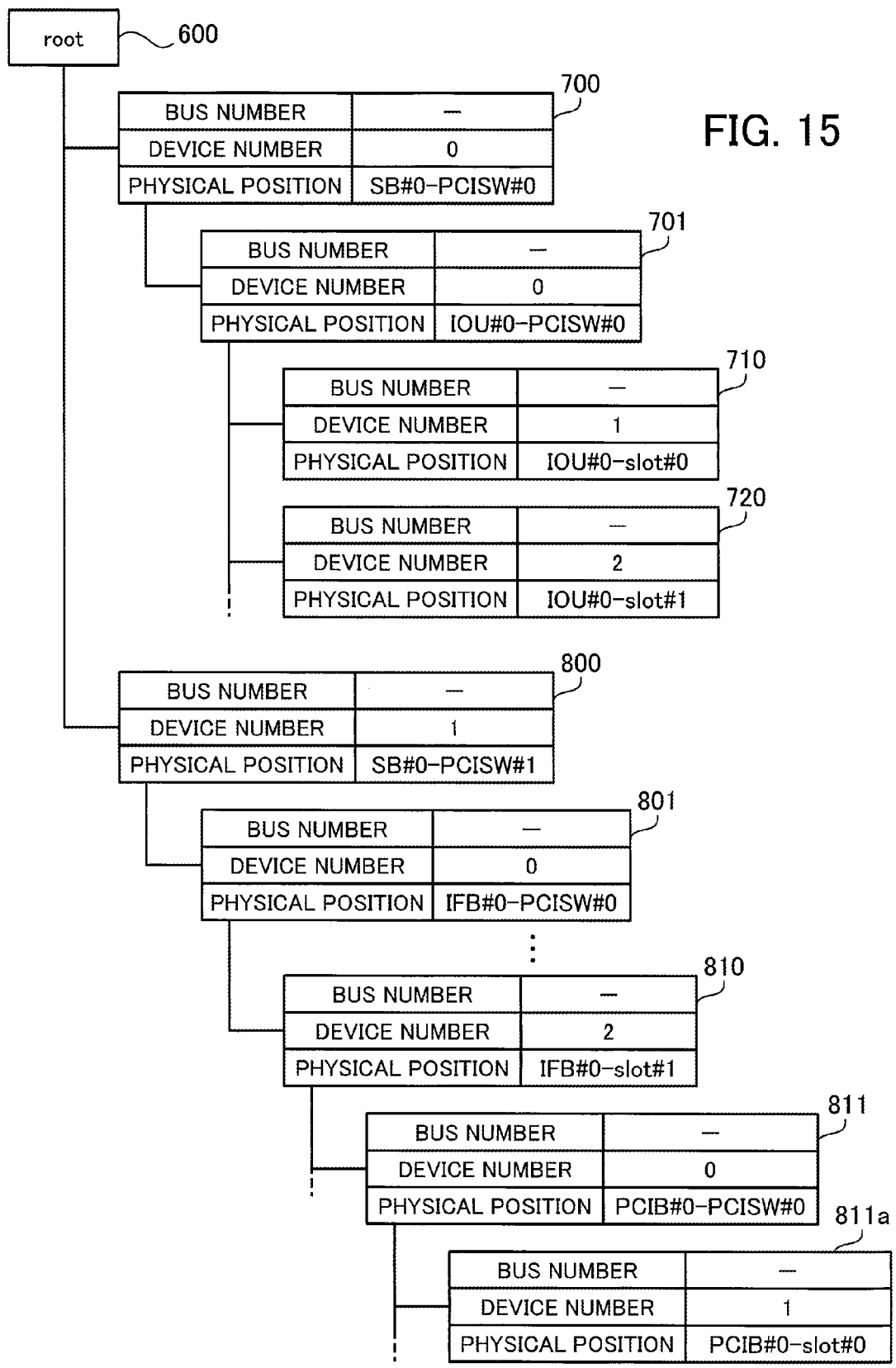
FIG. 15 illustrates an example of setting bus numbers of the second embodiment.

FIG. 15 illustrates an example of setting bus numbers of the second embodiment. In FIG. 15, there is illustrated information indicative of the tree structure of the PCI units corresponding to the example of the connection of FIG. 7. However, the bus number is not set yet. Therefore, the bus number in each node is denoted as "-" (hyphen). As previously described, the management unit 166 may recognize the tree structure based on the connection setting table 165a and device configuration table 165b stored in the storage unit 165.

Here, a node 600 is a route complex. A node 700 is the information corresponding to the PCI switch 113. A node 701 is the information corresponding to the IO controller 141. A node 710 is the information corresponding to the PCI card 301. A node 720 is the information corresponding to the PCI card 302. A node 800 is the information corresponding to the PCI switch 114. A node 801 is the information corresponding to the PCI switch 151. A node 810 is the information corresponding to the PCI box IF 153. A node 811 is the information corresponding to the PCI switch 201. A node 811a is the information corresponding to the PCI card 301b. Note that the illustration of the nodes corresponding to other PCI devices including the communication IF 152 and PCI box IF 154 is omitted (hereinafter, the same).

The management unit 166 may set the bus number of each node by applying the PCI device tree information obtained from the BIOS 115 or OS 116 to the tree structure of PCI units illustrated in FIG. 15.

Figure 16:
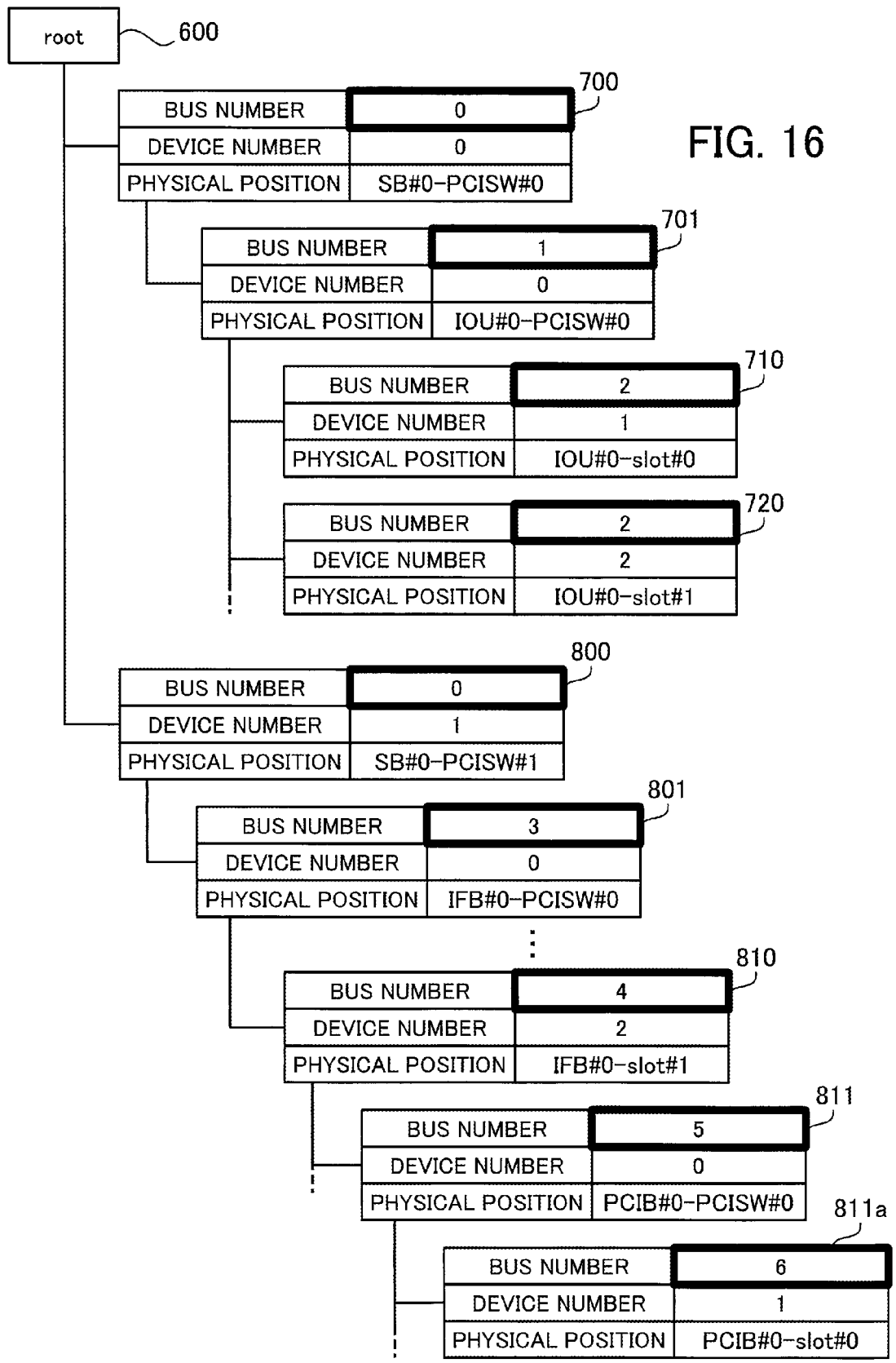
FIG. 16 illustrates the example of setting bus numbers of the second embodiment (continued)

FIG. 16 illustrates the example of setting bus numbers of the second embodiment (continued). In FIG. 16, there is illustrated a state where a bus number is set at each node. The management unit 166 obtains the PCI device tree information corresponding to the example of the connection of FIG. 7 from the BIOS 115 or OS 116. In this case, the bus number of each node will be set as follows.

The bus number of the node 700 is "0". The bus number of the node 701 is "1". The bus number of the node 710 is "2". The bus number of the node 720 is "2". The bus number of the node 800 is "0". The bus number of the node 801 is "3". The bus number of the node 810 is "4". The bus number of the node 811 is "5". The bus number of the node 811a is "6".

In this manner, the PCI device tree information including the correspondence relations with physical positions is completed. The management unit 166 manages the PCI device tree, including the correspondence relations with the physical positions illustrated in FIG. 16, using the physical position management table 165c. When the PCI device tree information illustrated in FIG. 16 is desired to be updated, the management unit 166 may overwrite an old bus number with a new bus number.

The identification information assigned to each PCI device may be changed also at the timing when a PCI device is added/deleted. Moreover, the identification information may be changed also at the timing when a PCI unit is added/deleted. This is because a PCI unit is for mounting a PCI device and the addition/deletion of the PCI unit accompanies the addition/deletion of a PCI device. Next, a procedure when a PCI device (or PCI unit) is added/deleted is described.

Figure 17:
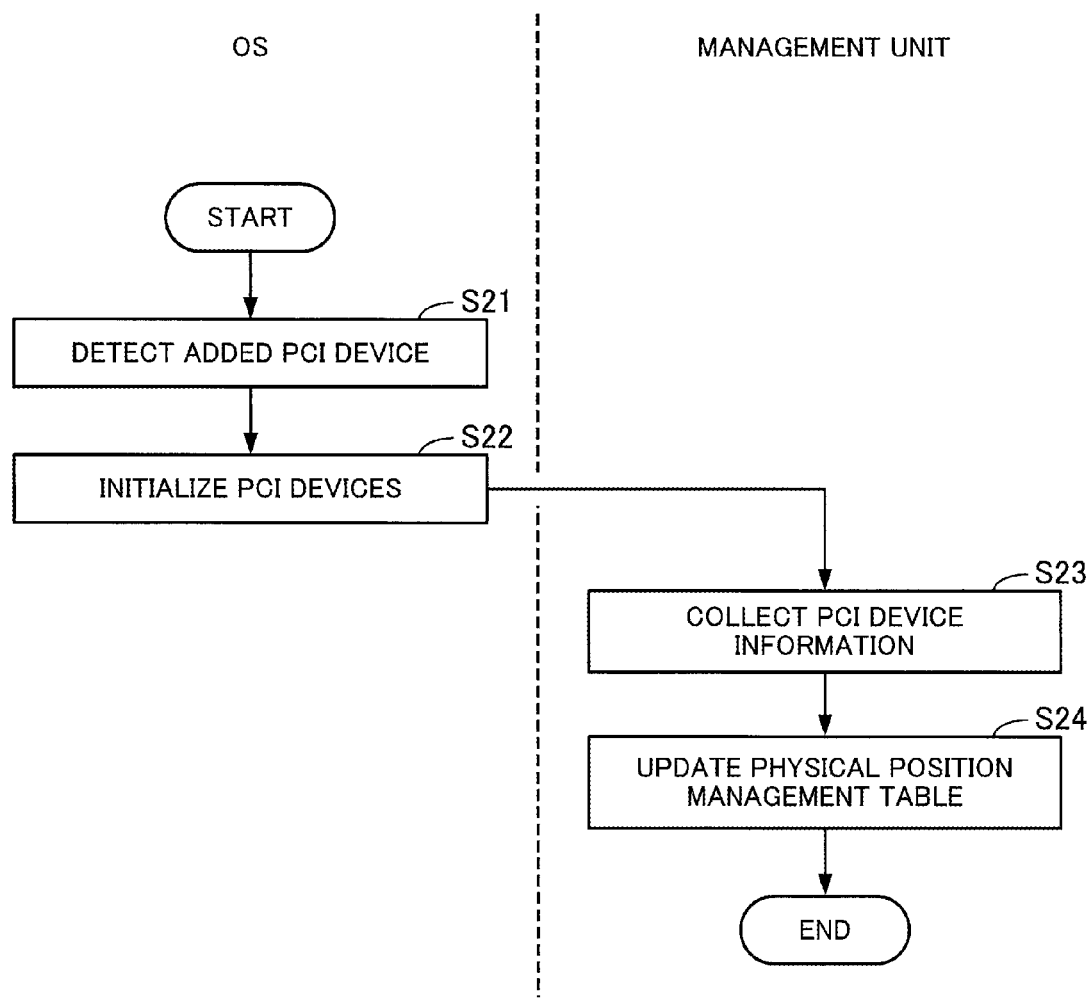
FIG. 17 is a flowchart illustrating an example of adding a PCI device of the second embodiment.

FIG. 17 is a flowchart illustrating an example of adding a PCI device of the second embodiment. Hereinafter, the procedure illustrated in FIG. 17 is described along the step numbers.

(Step S21) The OS 116 detects an added PCI device. "Add" implies the establishment of a logical connection with an SB, for example. By adding a PCI device, the PCI device may be used from a relevant SB. As the case where a PCI device is added to the SB 110, the following cases may be contemplated. (1) The case where a new PCI unit (e.g., PCI box 200a) is added to the SB 110 using the group selection window 500 and unit selection window 510. (2)

The case where a PCI card is newly inserted into any open PCI slot of the IO unit 140 or PCI box 200.

(Step S22) The OS 116 initializes PCI devices and/or device drivers. Specific processing contents are the same as in step S14 of FIG. 14. In the initialization, the OS 116 changes the bus number of each PCI device in the PCI device tree information. Upon completion of the initialization of the PCI devices by the OS 116, the notification unit 117 notifies the management unit 166 of the completion of initialization. The management unit 166 receives the notification. In the notification, a change in the PCI device tree may be notified.

(Step S23) The management unit 166 collects the information about a peripheral device from the OS 116 via the notification unit 117. The information collected from the OS 116 includes the updated PCI device tree information.

(Step S24) The management unit 166 updates the physical position management table 165c in accordance with a change of the bus number made by the OS 116.

In this manner, when a PCI device (or PCI unit) is added, the management unit 166 obtains the information about the updated PCI device from the OS 116, and updates the correspondence relation between identification information assigned to the PCI device and the information indicative of the physical position of the PCI device. Moreover, the identification information assigned to each PCI device may be changed also at the timing when the PCI device (or PCI unit) is deleted (logical connection is released). Next, the procedure when a PCI device (or PCI unit) is deleted is described.

Figure 18:
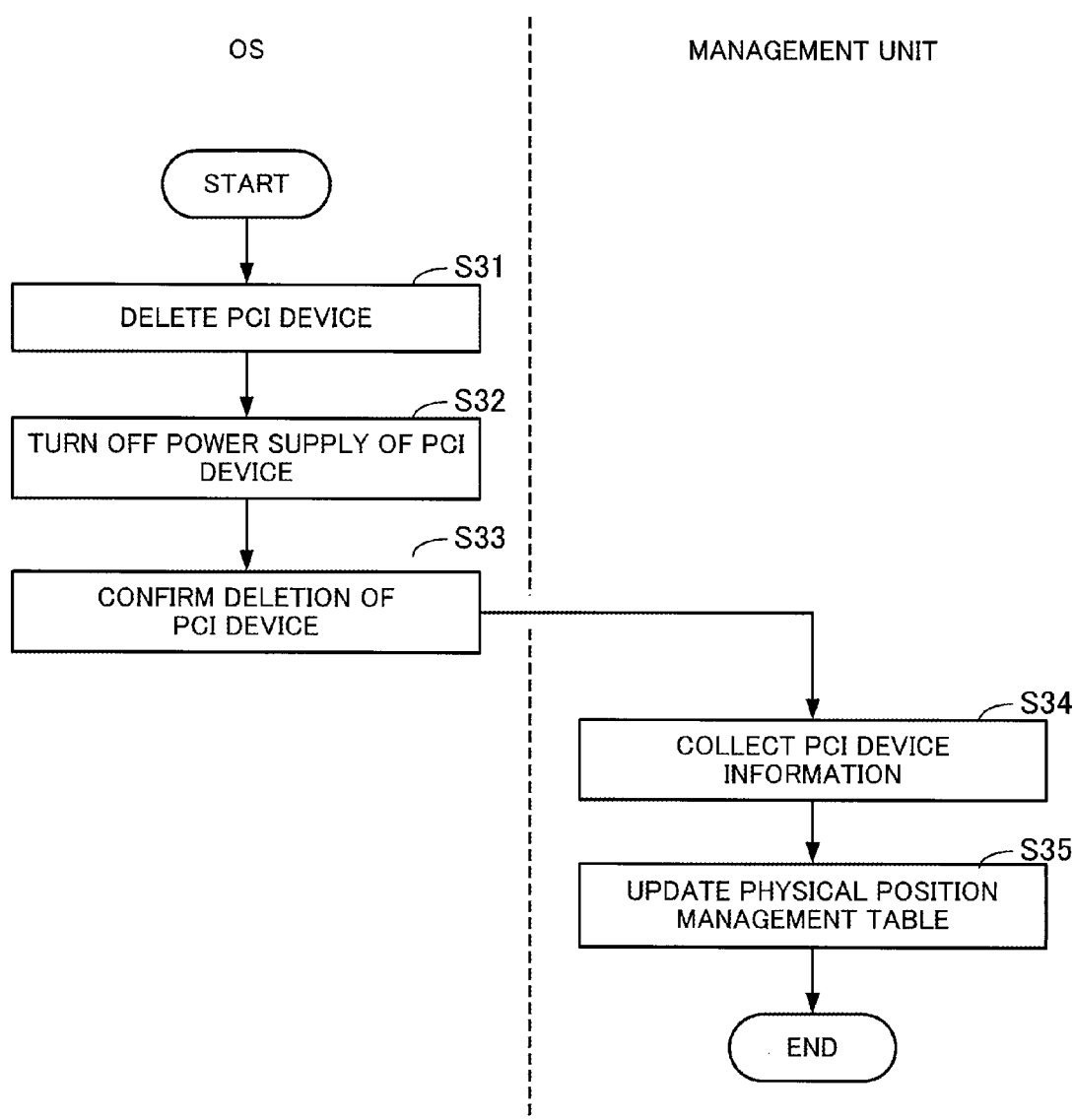
FIG. 18 is a flowchart illustrating an example of deleting the PCI device of the second embodiment.

FIG. 18 is a flowchart illustrating an example of deleting a PCI device of the second embodiment. Hereinafter, the procedure illustrated in FIG. 18 is described along the step numbers.

(Step S31) The OS 116 receives an instruction for deleting a PCI device. For example, the instruction may be input to the OS 116 by an administrator using an input device, or may be input to the OS 116 by the management unit 166. Then, the OS 116 performs the deletion of the PCI device and the deletion of a relevant device driver. In the deletion, the OS 116 updates the PCI device tree information.

(Step S32) The OS 116 turns off the power supply of the relevant PCI device.

(Step S33) Upon confirmation of completion of the deletion of the PCI device performed by the OS 116, the notification unit 117 notifies the management unit 166 of the completion of deletion. The management unit 166 receives the notification. The notification notifies a change in the PCI device tree.

(Step S34) The management unit 166 collects the information about the PCI device from the OS 116 via the notification unit 117. The information collected from the OS 116 includes the updated PCI device tree information.

(Step S35) The management unit 166 updates the physical position management table 165c in accordance with a change of the bus number made by the OS 116.

In this manner, when a PCI device (or PCI unit) is deleted, the management unit 166 obtains the updated information about the PCI device from the OS 116, and updates the correspondence relation between identification information assigned to the PCI device and the information indicative of the physical position of the PCI device.

In this manner, at each timing when the PCI device tree information is updated by the BIOS 115 or OS 116, the management unit 166 obtains the relevant information from the BIOS 115 and OS 116 and updates the physical position management table 165c. Therefore, by referring to the physical position management table 165c, the management unit 166 may properly respond to an inquiry of the mounting position of a PCI device from each SB. Next, the procedure is described. Note that, hereinafter, a case is illustrated where the OS 116 inquiries about the mounting position of a PCI device, but the procedure is the same in the case where the BIOS 115 inquires about the mounting position of a PCI device.

Figure 19:
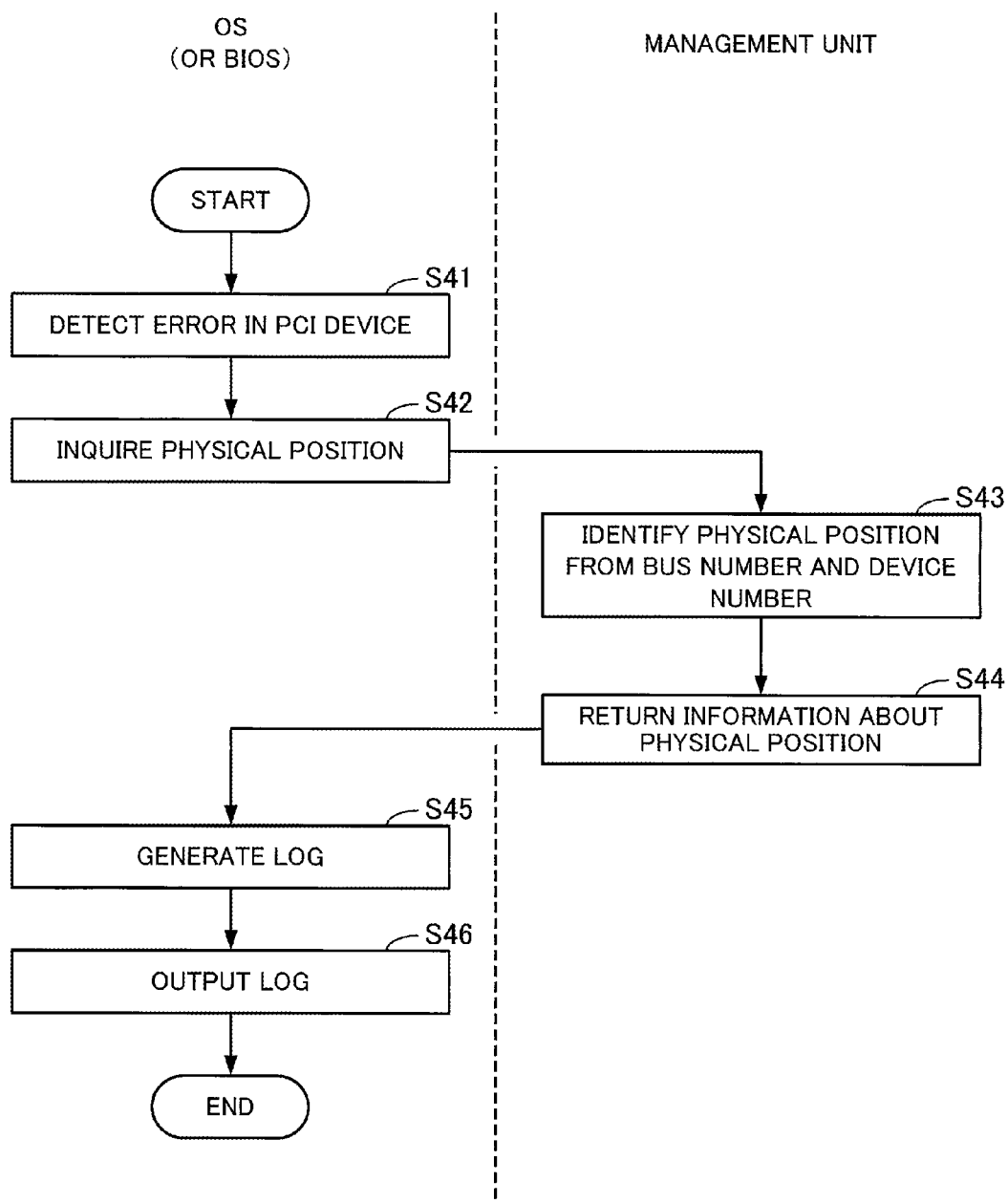
FIG. 19 is a flowchart illustrating an example of the position response processing of the second embodiment.

FIG. 19 is a flowchart illustrating an example of processing position response of the second embodiment. Hereinafter, the procedure illustrated in FIG. 19 is described along the step numbers.

(Step S41) The OS 116 detects that an error has occurred in any of the PCI devices. The OS 116 identifies the bus number and device number of the PCI device in which an error has occurred, and outputs the same to the notification unit 117. For example, if it is an error of the PCI card 301, the bus number:device number is "2:1". If it is an error of the PCI switch 201, the bus number:device number is "5:0".

(Step S42) The notification unit 117 inquires the management unit 166 of the physical position of the PCI device in which an error has occurred. This inquiry includes the bus number and device number obtained from the OS 116. The management unit 166 receives the inquiry.

(Step S43) The management unit 166 retrieves a set of the bus number and device number (identification information), which is obtained from the notification unit 117, from the physical position management table 165c stored in the storage unit 165. The management unit 166 extracts the information about the physical position included in the retrieved record. For example, if the bus number:device number is "2:1", the physical position "IOU#0-slot#0" is extracted. If the bus number:device number is "5:0", the physical position "PCIB#0-PCISW#0" is extracted.

(Step S44) The management unit 166 transmits to the notification unit 117 the information about the physical position extracted in step S43. The notification unit 117 receives the information about the physical position. The notification unit 117 outputs the information about the physical position to the OS 116.

(Step S45) The OS 116 generates a log regarding the PCI device in which an error has occurred. The log includes the information indicative of the physical position of the PCI device that is obtained via the notification unit 117.

(Step S46) The OS 116 outputs the generated log. The OS 116 may output the log to a predetermined log file. The OS 116 may display the content of the log onto a display connected to the server 100.

In this manner, the management unit 166 returns the position of the PCI device to an inquiry from the BIOS 115 or OS 116. The management unit 166 properly updates the physical position management table 165c managed by the management unit 166 itself, at each timing when the BIOS 115 or OS 116 changes the setting of the PCI device tree. Therefore, the management unit 166 may properly response to an inquiry from the BIOS 115 or OS 116.

Note that, in the description of FIG. 7, assume that the identification information of a PCI device may include a function number. In this case, the management unit 166 may collect the PCI device tree information including identification information including a function number from the BIOS 115 or OS 116. Therefore, the management unit 166 may manage the correspondence relation between the relevant identification information and mounting position. The notification unit 117 may inquire the management unit 166 of a position using identification information including a function number. Then, the management unit 166 may return the mounting position corresponding to the identification information.

Figure 20:
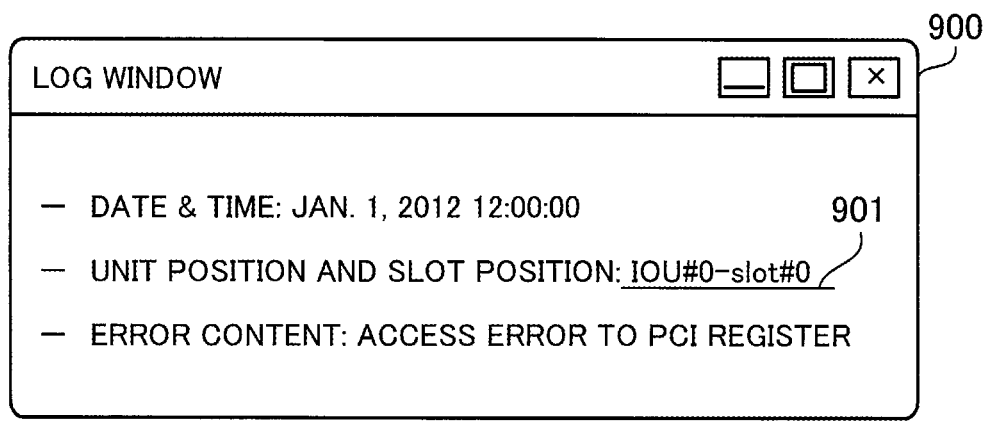
FIG. 20 illustrates an example of the log output of the second embodiment.

FIG. 20 illustrates an example of the log output of the second embodiment. The OS 116 may output the log of an error to a log window 900. In this case, for example, the log may include positional information 901 in addition to the content of an error. For example, the positional information 901 is a character string "IOU#0-slot#0".

A maintenance personnel of the server 100 may recognize a position on the server 100 having mounted thereon a PCI device in which an error has occurred, with reference to the positional information 901. For example, the character string output as the positional information is denoted at a position visible from the outside of the PCI slots 145, 145a, . . . or the PCI slots 202, 202a, . . . .

More specifically, a character string "slot#0" is denoted at a position visible from the outside of the slot 145. Then, a maintenance personnel, having referred to the character string of the positional information 901, may identify the IO unit 140 by the portion "IOU#0" of the character string. The IO unit 140 is mounted above the IO unit 140a as illustrated in FIG. 3. Furthermore, a maintenance personnel may identify the PCI card 301 by collating the portion "slot#0" of the character string of the positional information 901 with the character string "slot#0" denoted on the outside of the slot 145.

Alternatively, the position on the server 100 indicated by a character string of the positional information may be described on the manual or the like of the server 100. Then, a maintenance personnel may identify a PCI device that needs a maintenance work, with reference to the content of the output log and the manual.

Figure 21:
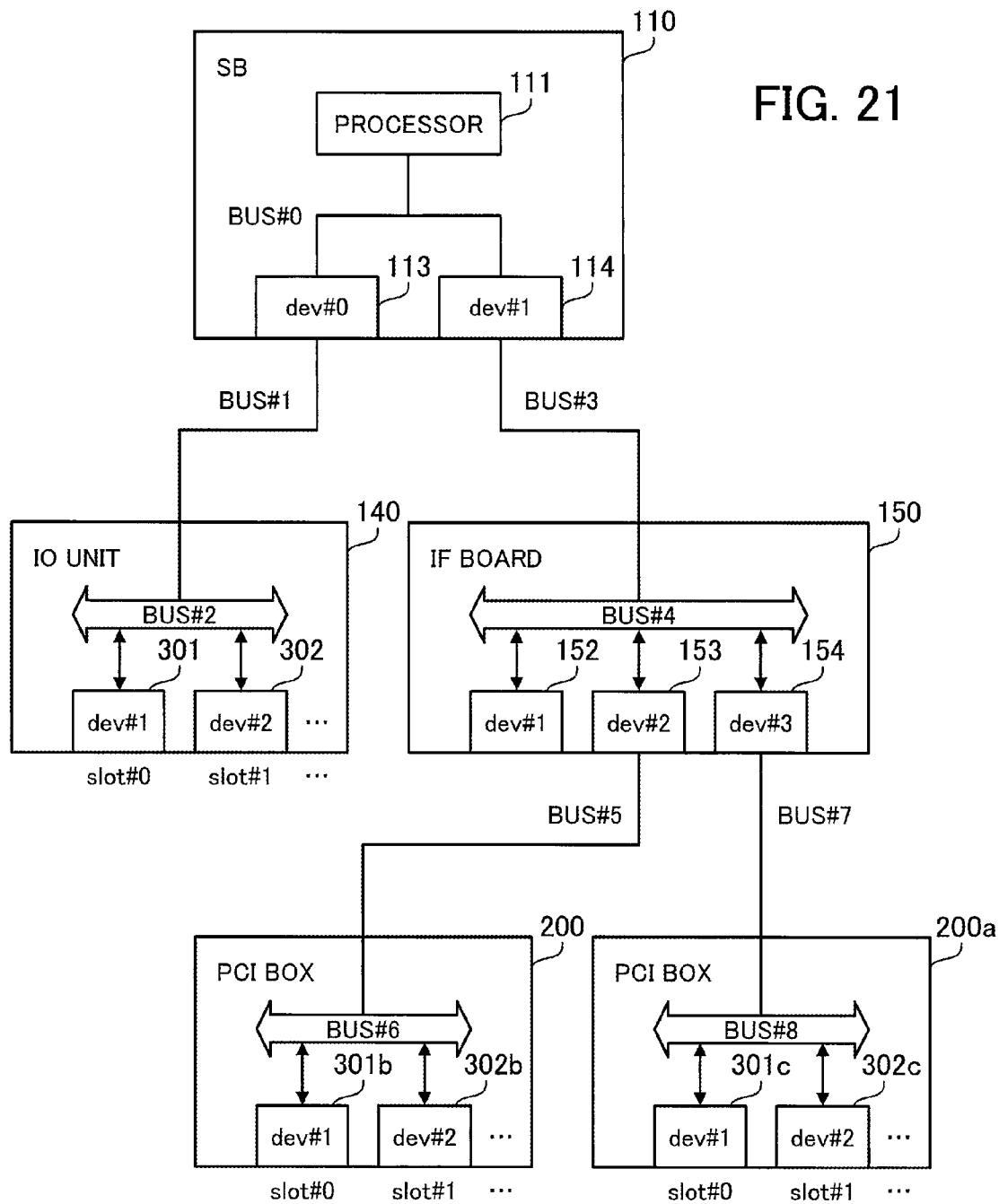
FIG. 21 illustrates an example of changing a bus number of the second embodiment.

FIG. 21 illustrates an example of changing a bus number of the second embodiment. In FIG. 21, only some PCI devices in each PCI unit are illustrated and the illustration of other PCI devices is omitted. Moreover, the device number is denoted in place of the name of each PCI device.

The PCI device tree information regarding the SB 110 is generated by the BIOS 115 that sets the bus number with respect to each PCI device. However, as described above, the PCI device tree information may be changed subsequently. For example, the PCI device tree information is changed at the timing when the OS 116 initializes peripheral devices. Moreover, for example, the PCI device tree information is changed at the timing when a PCI device (or PCI unit) is added to/deleted from the SB 110. Therefore, the initial PCI device tree information is not always maintained.

For example, the bus number may be updated because the PCI box 200a is added to the PCI device tree illustrated in FIG. 7. In this case, bus numbers may be newly re-assigned, i.e., the bus numbers "7" and "8" may be added.

Moreover, the PCI box 200 might be deleted from the state where the PCI box 200a has been added. Also in this case, a bus number is newly re-assigned. In this case, for example, a bus number different from the above-described one might be assigned to the IF board 150 or PCI box 200a. For example, if the connection with the PCI box 200 is released, the bus numbers "5" and "6" will be freed. Accordingly, a bus under the PCI box IF 154 might be changed from the bus number "7" to the bus number "5", and the bus of a PCI switch inside the PCI box 200a might be changed from the bus number "8" to the bus number "6". Then, the identification information of each PCI device of the PCI box 200a will be also changed.

The management unit 166 updates the physical position management table 165c following such updating of the PCI device tree. Therefore, upon receipt of an inquiry of the mounting position of a PCI device from the BIOS 115 or OS 116, appropriate information indicative of the mounting position of the PCI device may be returned. Therefore, the BIOS 115 or OS 116 may include the appropriate information indicative of the mounting position of a PCI device into a log and output the log.

Note that, the information processing of the second embodiment is assumed to be realized by the management unit 166 included in the MMB 160, but another hardware may have the function of the management unit 166. For example, the SVP 143 might have a function corresponding to the management unit 166.

Figure 22:
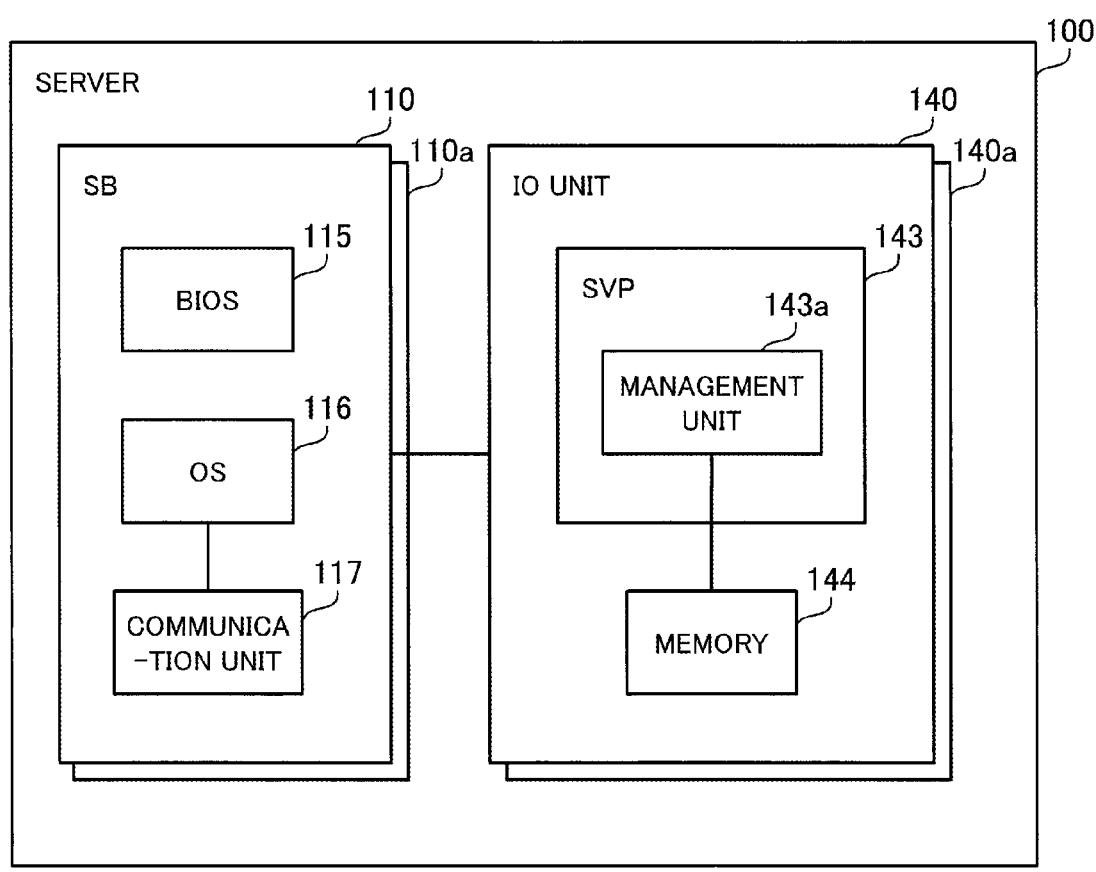
FIG. 22 illustrates another example of the software configuration of the second embodiment (Part 1)

FIG. 22 illustrates another example of the software configuration of the second embodiment (Part 1). The SVP 143 includes a management unit 143a. The function of the management unit 143a may be realized by the SVP 143 that executes programs stored in the memory 144. The management unit 143a performs the same procedure as the management unit 166, in place of the management unit 166.

The management unit 143a may store into the memory 144 the information corresponding to the connection setting table 165a, device configuration table 165b, and physical position management table 165c that are stored into the storage unit 165. Alternatively, the management unit 143a may obtain the connection setting table 165a and device configuration table 165b from the MMB 160, and store only the information corresponding to the physical position management table 165c into the memory 144 for management.

In this manner, the management unit 143a may be provided in the SVP 143 so as to provide the information indicative of the mounting position of a PCI device with respect to the BIOS 115 or OS 116. Because the SVP 143 is mounted for each IO unit in this manner, the procedure of the second embodiment may be distributed to and performed by a plurality of SVPs. For example, when the SB 110 and IO unit 140 are logically connected, the management unit 143a manages the correspondence relation between the PCI device tree and the device position set by the BIOS 115 or OS 116. Moreover, for example, when the SB 110a and IO unit 140a are logically connected, the management unit operating in the SVP of the IO unit 140a manages the correspondence relation between the PCI device tree and device position set by the BIOS 115 or OS 116 operating in the SB 110a. If the procedure is distributed in this manner, the load on the MMB 160 will be reduced.

Moreover, if the management unit is provided in the SVP, the management unit 166 does not need to be provided in the MMB 160. Alternatively, the information processing of the second embodiment may be realized even without providing the MMB 160 in the server 100, Note that, in the second embodiment, the notification unit 117 is assumed to mediate the communication between the OS 116 and the management unit 166, but an ACPI (Advanced Configuration and Power Interface) driver may mediate the communication between the OS 116 and the management unit 166. Here, the ACPI driver is the software for power supply management.

Figure 23:
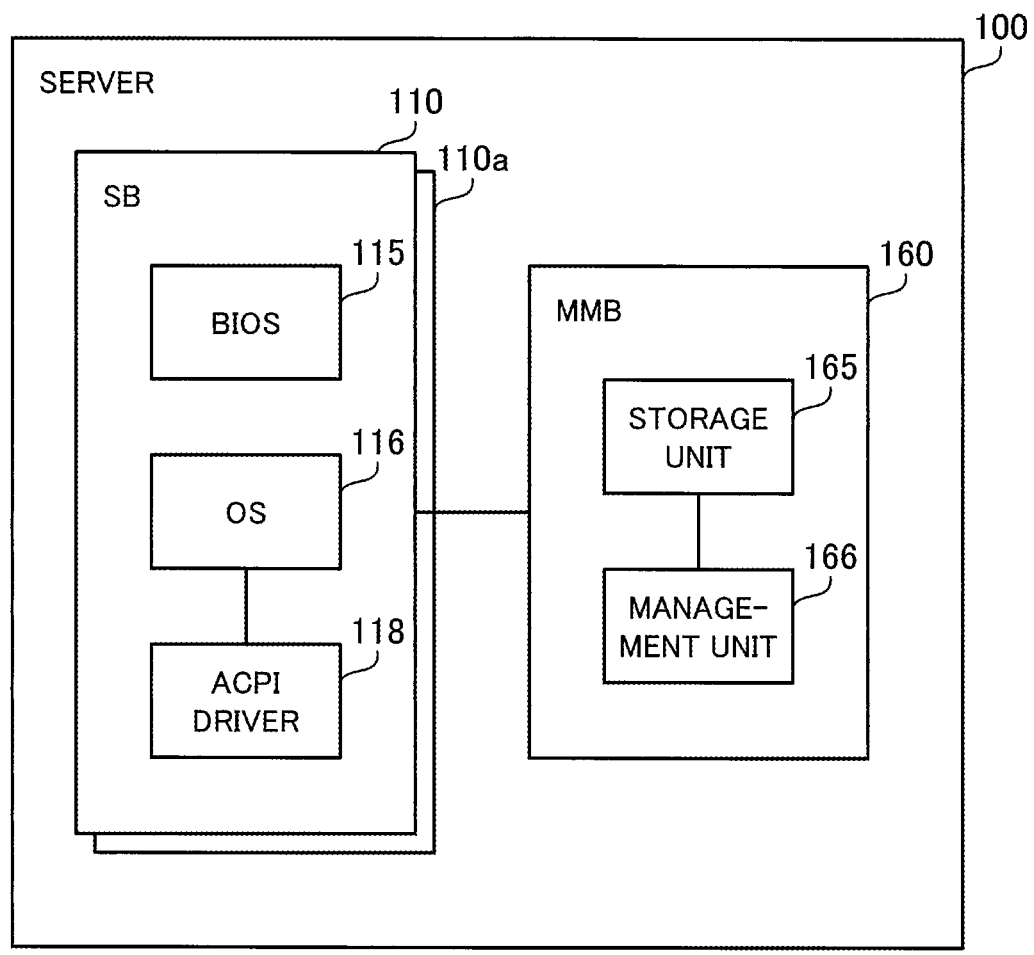
FIG. 23 illustrates another example of the software configuration of the second embodiment (Part 2).

FIG. 23 illustrates another example of the software configuration of the second embodiment (Part 2). The SB 110 may realize the function of the notification unit 117 using the ACPI driver 118. For example, the program of the ACPI driver 118 may be stored in the ROM 142 or the like in advance. The processor 111 may exhibit the function of the ACPI driver 118 by loading into the RAM 112 the programs stored in the ROM 142 and executing the same.

The ACPI driver 118 performs the notification of completion of the initialization of the PCI devices performed by the OS 116, the inquiry of the mounting position of a PCI device, and the like with respect to the management unit 166. Specifically, the procedures performed by the notification unit 117 in FIGS. 14, 17, 18, and 19 may be interpreted as the procedure performed by the ACPI driver 118. The management unit 166 communicates with the OS 116 via the ACPI driver 118 in place of the notification unit 117. In this case, the notification unit 117 does not need to be provided in the SB 110.

Note that, in the second embodiment, the PCIe has been illustrated and described as the interface for function enhancement, but the information processing of the second embodiment may be applicable also in using another type of interface.

Moreover, as previously described, the information processing of the first embodiment may be realized by causing the computation unit 2b to execute computer programs. Moreover, the information processing of the second embodiment may be realized by causing the processors 111 and 161 and SVP 143 to execute computer programs. The computer programs may be stored on the computer readable storage media (e.g., the optical disc 15 or the like).

For the purpose of distributing programs, portable storage media containing the programs are provided. Moreover, programs may be stored in a storage device of another computer in advance and distributed to other computers via a network. For example, the computer stores the programs recorded on portable storage media or the programs received from other computers into a storage device and reads the programs from the storage device and executes the same. However, the computer may directly execute the programs read from the portable recording media or may directly execute the programs received via the network from other computers.

Moreover, at least a part of the above-described information processing may be implemented by an electronic circuit, such as a DSP, an ASIC, or a PLD.

According to an aspect of the embodiment, the position of a peripheral device may be appropriately provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of devices;
a plurality of peripheral devices;
a memory configured to store management information including information indicative of a correspondence relation between a device among the plurality of devices and a peripheral device, among the plurality of peripheral devices, that is used by the device and information indicative of a correspondence relation between first identification information assigned to the peripheral device by the device and information indicative of a position of the peripheral device; and
a processor configured to perform a procedure including:
receiving a notification that the device has re-assigned second identification information to the peripheral device from the device;
updating the management information to associate the information indicative of the position with the second identification information instead of the first identification information;
receiving an inquiry including the second identification information from the device when the device outputs a log regarding the peripheral device; and
providing, in response to the inquiry, the device with the information indicative of the position corresponding to the second identification information with reference to the updated management information.

2. The information processing apparatus according to claim 1,
wherein the first identification information is assigned by first software operating on the device; and
wherein the receiving a notification includes receiving the notification when the second identification information has been re-assigned by second software operating on the device.

3. The information processing apparatus according to claim 1, wherein the procedure further includes:
when another peripheral device among the plurality of peripheral devices is added to the device, receiving another notification that third identification information of said another peripheral device has been assigned by the device; and
adding information indicative of a correspondence relation between the device and said another peripheral device and information indicative of a correspondence relation between the third identification information and information indicative of a position of said another peripheral device to the management information.

4. The information processing apparatus according to claim 1, wherein the procedure further includes:
when connection between the device and another peripheral device among the plurality of peripheral devices is released, receiving another notification that third identification information of said another peripheral device has been deleted, the third identification information being assigned by the device; and
deleting information indicative of a correspondence relation between the device and said another peripheral device and information indicative of a correspondence relation between the third identification information and information indicative of a position of said another peripheral device, from the management information.

5. The information processing apparatus according to claim 1, wherein the receiving a notification includes receiving the notification when another peripheral device is added to the device or when connection between the device and said another peripheral device is released.

6. The information processing apparatus according to claim 1, wherein the correspondence relation between the device and the peripheral device is able to be changed when the plurality of devices and the plurality of peripheral devices are in operation.

7. A non-transitory computer-readable storage medium storing a computer program that causes a computer to perform a procedure comprising:
receiving a notification that a device has re-assigned first identification information to a peripheral device used by the device, from the device, the device being among a plurality of devices included in the computer, the peripheral device being among a plurality of peripheral devices included in the computer;

updating management information including information indicative of a correspondence relation between the device and the peripheral device and information indicative of a correspondence relation between second identification information of the peripheral device and information indicative of a position of the peripheral device, to associate the information indicative of the position with the first identification information instead of the second identification information;

receiving an inquiry including the first identification information from the device when the device outputs a log regarding the peripheral device; and providing, in response to the inquiry, the device with the information indicative of the position corresponding to the first identification information with reference to the updated management information.

8. A log output method executed by an information processing apparatus, the method comprising:

receiving, by a processor of the information processing apparatus, a notification that a device has re-assigned first identification information to a peripheral device used by the device, from the device, the device being among a plurality of devices included in the information processing apparatus, the peripheral device being among a plurality of peripheral devices included in the information processing apparatus;

updating, by the processor, management information including information indicative of a correspondence relation between the device and the peripheral device and information indicative of a correspondence relation between second identification information of the peripheral device and information indicative of a position of the peripheral device, to associate the information indicative of the position with the first identification information instead of the second identification information;

receiving, by the processor, an inquiry including the first identification information from the device when the device outputs a log regarding the peripheral device; and providing, by the processor, the device with the information indicative of the position corresponding to the first identification information with reference to the updated management information in response to the inquiry.

* * * * *